United States Patent
Saggar et al.

(10) Patent No.: US 12,395,392 B2
(45) Date of Patent: Aug. 19, 2025

(54) CYCLIC PREFIX GUARD INTERVAL FOR INCREASED DELAY SPREAD

(71) Applicant: QUALCOMM Incorporated, San Diego, CA (US)

(72) Inventors: Hemant Saggar, San Diego, CA (US); Iyab Issam Sakhnini, San Diego, CA (US); Tao Luo, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 395 days.

(21) Appl. No.: 18/168,700

(22) Filed: Feb. 14, 2023

(65) Prior Publication Data

US 2024/0275657 A1 Aug. 15, 2024

(51) Int. Cl.
| | |
|---|---|
| *H04W 4/00* | (2018.01) |
| *H04B 7/06* | (2006.01) |
| *H04L 5/00* | (2006.01) |
| *H04L 27/26* | (2006.01) |
| *H04W 24/10* | (2009.01) |
| *H04W 72/0453* | (2023.01) |

(52) U.S. Cl.
CPC ....... *H04L 27/2636* (2013.01); *H04B 7/0617* (2013.01); *H04L 5/0007* (2013.01); *H04W 24/10* (2013.01); *H04W 72/0453* (2013.01)

(58) Field of Classification Search
CPC ............... H04L 27/2636; H04L 5/0007; H04L 27/26025; H04L 27/2607; H04L 27/2646; H04B 7/0617; H04W 24/10; H04W 72/0453
See application file for complete search history.

(56) References Cited

U.S. PATENT DOCUMENTS

| | | | | |
|---|---|---|---|---|
| 11,050,599 | B2 * | 6/2021 | Zhang | H04W 56/003 |
| 11,284,440 | B2 * | 3/2022 | Qian | H04W 74/0833 |
| 11,412,513 | B2 * | 8/2022 | Zhang | H04L 5/0092 |
| 2013/0315321 | A1 * | 11/2013 | Rajagopal | H04B 7/0695 375/260 |
| 2015/0078292 | A1 * | 3/2015 | Walker | H04W 72/30 370/329 |
| 2019/0253949 | A1 * | 8/2019 | Park | H04W 76/19 |
| 2019/0253966 | A1 * | 8/2019 | Park | H04W 52/0209 |
| 2019/0261425 | A1 * | 8/2019 | Park | H04W 76/27 |
| 2025/0141480 | A1 * | 5/2025 | Boumaiza | H04B 7/0617 |

* cited by examiner

*Primary Examiner* — Thai Dinh Hoang
(74) *Attorney, Agent, or Firm* — Holland & Hart / QUALCOMM Incorporated

(57) ABSTRACT

Methods, systems, and devices for wireless communications are described. A user equipment (UE) may transmit an indication that the UE supports a plurality of cyclic prefix configurations. The UE may receive, from a network entity, an indication of a first cyclic prefix configuration of the plurality of cyclic prefix configurations, the first cyclic prefix configuration indicating a first symbol period structure that includes a guard interval that occurs in a symbol period prior to a portion of the symbol period copied as a cyclic prefix based at least in part on a delay spread exceeding a length of the cyclic prefix. The UE may communicate one or more messages with the network entity in accordance with the first cyclic prefix configuration.

30 Claims, 16 Drawing Sheets

CYCLIC PREFIX GUARD INTERVAL FOR INCREASED DELAY SPREAD

FIELD OF TECHNOLOGY

The following relates to wireless communications, including cyclic prefix guard interval for increased delay spread.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

In some wireless communications systems, a wireless device may communicate symbols with cyclic prefixes. However, such approaches may be improved.

SUMMARY

The described techniques relate to improved methods, systems, devices, and apparatuses that support cyclic prefix guard interval for increased delay spread. A user equipment (UE) may transmit an indication that the UE supports a plurality of cyclic prefix configurations. The UE may receive, from a network entity, an indication of a first cyclic prefix configuration of the plurality of cyclic prefix configurations, the first cyclic prefix configuration indicating a first symbol period structure that includes (in some cases, at least a fraction of) a guard interval that occurs in a symbol period prior to a portion of the symbol period copied as a cyclic prefix based at least in part on a delay spread exceeding a length of the cyclic prefix. The UE may communicate one or more messages with the network entity in accordance with the first cyclic prefix configuration.

A method for wireless communication at a user equipment (UE) is described. The method may include transmitting an indication that the UE supports a set of multiple cyclic prefix symbol configurations, receiving, from a network entity, an indication of a first cyclic prefix configuration of the set of multiple cyclic prefix symbol configurations, the first cyclic prefix configuration indicating a first symbol period structure that includes a guard interval that occurs in a symbol period prior to a portion of the symbol period copied as a cyclic prefix based on a delay spread exceeding a length of the cyclic prefix, and communicating one or more messages with the network entity in accordance with the first cyclic prefix configuration.

An apparatus for wireless communication at a UE is described. The apparatus may include a processor, memory coupled with the processor, and instructions stored in the memory. The instructions may be executable by the processor to cause the apparatus to transmit an indication that the UE supports a set of multiple cyclic prefix symbol configurations, receive, from a network entity, an indication of a first cyclic prefix configuration of the set of multiple cyclic prefix symbol configurations, the first cyclic prefix configuration indicating a first symbol period structure that includes a guard interval that occurs in a symbol period prior to a portion of the symbol period copied as a cyclic prefix based on a delay spread exceeding a length of the cyclic prefix, and communicate one or more messages with the network entity in accordance with the first cyclic prefix configuration.

Another apparatus for wireless communication at a UE is described. The apparatus may include means for transmitting an indication that the UE supports a set of multiple cyclic prefix symbol configurations, means for receiving, from a network entity, an indication of a first cyclic prefix configuration of the set of multiple cyclic prefix symbol configurations, the first cyclic prefix configuration indicating a first symbol period structure that includes a guard interval that occurs in a symbol period prior to a portion of the symbol period copied as a cyclic prefix based on a delay spread exceeding a length of the cyclic prefix, and means for communicating one or more messages with the network entity in accordance with the first cyclic prefix configuration.

A non-transitory computer-readable medium storing code for wireless communication at a UE is described. The code may include instructions executable by a processor to transmit an indication that the UE supports a set of multiple cyclic prefix symbol configurations, receive, from a network entity, an indication of a first cyclic prefix configuration of the set of multiple cyclic prefix symbol configurations, the first cyclic prefix configuration indicating a first symbol period structure that includes a guard interval that occurs in a symbol period prior to a portion of the symbol period copied as a cyclic prefix based on a delay spread exceeding a length of the cyclic prefix, and communicate one or more messages with the network entity in accordance with the first cyclic prefix configuration.

In some examples of the method, apparatuses, and non-transitory computer-readable medium described herein, receiving the indication of the first cyclic prefix configuration may include operations, features, means, or instructions for receiving the indication of the first cyclic prefix configuration that indicates the first symbol period structure may have a first guard interval located before the portion of the symbol period copied as the cyclic prefix and a second guard interval located at an end of the portion of the symbol period copied as the cyclic prefix.

In some examples of the method, apparatuses, and non-transitory computer-readable medium described herein, receiving the indication of the first cyclic prefix configuration may include operations, features, means, or instructions for receiving the indication of the first cyclic prefix configuration that indicates a length of the first guard interval and a length of the second guard interval may be each less than or equal to a length of the cyclic prefix.

In some examples of the method, apparatuses, and non-transitory computer-readable medium described herein, receiving the indication of the first cyclic prefix configuration may include operations, features, means, or instructions for receiving the indication of the first cyclic prefix configuration that indicates the first symbol period structure includes a set of multiple consecutive guard intervals located at an end of the symbol period.

In some examples of the method, apparatuses, and non-transitory computer-readable medium described herein, each guard interval may be of a length equal to the length of the cyclic prefix and a last guard interval of the set of multiple consecutive guard intervals may be included in the portion of the symbol period copied as the cyclic prefix.

In some examples of the method, apparatuses, and non-transitory computer-readable medium described herein, the first symbol period structure further includes an additional guard interval that may be of a length that may be less than the length of the cyclic prefix and may be located immediately before the set of multiple consecutive guard intervals.

In some examples of the method, apparatuses, and non-transitory computer-readable medium described herein, receiving the indication of the first cyclic prefix configuration may include operations, features, means, or instructions for receiving the indication of the first cyclic prefix configuration that indicates to interleave that a symbol having the first symbol period structure with a second symbol having a second symbol structure that differs from the first symbol period structure.

Some examples of the method, apparatuses, and non-transitory computer-readable medium described herein may further include operations, features, means, or instructions for communicating a delay spread measurement report that indicates the delay spread, where the indication of the first cyclic prefix configuration may be based on the delay spread measurement report.

In some examples of the method, apparatuses, and non-transitory computer-readable medium described herein, receiving the indication of the first cyclic prefix configuration may include operations, features, means, or instructions for receiving the indication of the first cyclic prefix configuration that indicates the first symbol period structure includes a set of one or more guard intervals, a quantity of one or more guard intervals, or both.

Some examples of the method, apparatuses, and non-transitory computer-readable medium described herein may further include operations, features, means, or instructions for receiving an indication of a delay spread associated with uplink transmissions from the UE and selecting the first cyclic prefix configuration based on to indication of the delay spread.

In some examples of the method, apparatuses, and non-transitory computer-readable medium described herein, receiving the indication of the first cyclic prefix configuration may include operations, features, means, or instructions for receiving the indication of the first cyclic prefix configuration that indicates the first symbol period structure includes a set of one or more guard intervals based on a prior cyclic prefix configuration that associates the first symbol period structure with the set of the one or more guard intervals.

In some examples of the method, apparatuses, and non-transitory computer-readable medium described herein, receiving the indication of the first cyclic prefix configuration may include operations, features, means, or instructions for receiving the indication of the first cyclic prefix configuration that indicates the first cyclic prefix configuration may be applicable to a set of subcarrier spacing values, may be inapplicable to one or more other subcarrier spacing values, or both.

In some examples of the method, apparatuses, and non-transitory computer-readable medium described herein, receiving the indication of the first cyclic prefix configuration may include operations, features, means, or instructions for receiving the indication of the first cyclic prefix configuration that indicates the first cyclic prefix configuration may be applicable to a first subcarrier spacing.

Some examples of the method, apparatuses, and non-transitory computer-readable medium described herein may further include operations, features, means, or instructions for receiving an indication that the UE may be to derive a second cyclic prefix configuration for a second subcarrier spacing based on the first cyclic prefix configuration and a delay spread capability of the UE associated with the first cyclic prefix configuration.

In some examples of the method, apparatuses, and non-transitory computer-readable medium described herein, the indication of the first cyclic prefix configuration may be transmitted via radio resource control signaling, medium access control control signaling, physical layer control signaling, or any combination thereof.

In some examples of the method, apparatuses, and non-transitory computer-readable medium described herein, receiving the indication of the first cyclic prefix configuration may include operations, features, means, or instructions for receiving the indication of the first cyclic prefix configuration that indicates quantized values corresponding to one or more lengths of one or more guard intervals of the first symbol period structure.

In some examples of the method, apparatuses, and non-transitory computer-readable medium described herein, the first cyclic prefix configuration may be applicable to uplink communications, downlink communications, or both.

A method for wireless communication at a network entity is described. The method may include receiving, from a UE, an indication that the UE supports a set of multiple cyclic prefix symbol configurations, transmitting, to the UE, an indication of a first cyclic prefix configuration of the set of multiple cyclic prefix symbol configurations, the first cyclic prefix configuration indicating a first symbol period structure that includes a guard interval that occurs in a symbol period prior to a portion of the symbol period copied as a cyclic prefix based on a delay spread exceeding a length of the cyclic prefix, and communicating one or more messages with the UE in accordance with the first cyclic prefix configuration.

An apparatus for wireless communication at a network entity is described. The apparatus may include a processor, memory coupled with the processor, and instructions stored in the memory. The instructions may be executable by the processor to cause the apparatus to receive, from a UE, an indication that the UE supports a set of multiple cyclic prefix symbol configurations, transmit, to the UE, an indication of a first cyclic prefix configuration of the set of multiple cyclic prefix symbol configurations, the first cyclic prefix configuration indicating a first symbol period structure that includes a guard interval that occurs in a symbol period prior to a portion of the symbol period copied as a cyclic prefix based on a delay spread exceeding a length of the cyclic prefix, and communicate one or more messages with the UE in accordance with the first cyclic prefix configuration.

Another apparatus for wireless communication at a network entity is described. The apparatus may include means for receiving, from a UE, an indication that the UE supports a set of multiple cyclic prefix symbol configurations, means for transmitting, to the UE, an indication of a first cyclic prefix configuration of the set of multiple cyclic prefix symbol configurations, the first cyclic prefix configuration indicating a first symbol period structure that includes a guard interval that occurs in a symbol period prior to a portion of the symbol period copied as a cyclic prefix based on a delay spread exceeding a length of the cyclic prefix, and means for communicating one or more messages with the UE in accordance with the first cyclic prefix configuration.

A non-transitory computer-readable medium storing code for wireless communication at a network entity is described. The code may include instructions executable by a processor to receive, from a UE, an indication that the UE supports a set of multiple cyclic prefix symbol configurations, transmit, to the UE, an indication of a first cyclic prefix configuration of the set of multiple cyclic prefix symbol configurations, the first cyclic prefix configuration indicating a first symbol period structure that includes a guard interval that occurs in a symbol period prior to a portion of the symbol period copied as a cyclic prefix based on a delay spread exceeding a length of the cyclic prefix, and communicate one or more messages with the UE in accordance with the first cyclic prefix configuration.

In some examples of the method, apparatuses, and non-transitory computer-readable medium described herein, transmitting the indication of the first cyclic prefix configuration may include operations, features, means, or instructions for transmitting the indication of the first cyclic prefix configuration that indicates the first symbol period structure may have a first guard interval located before the portion of the symbol period copied as the cyclic prefix and a second guard interval located at an end of the portion of the symbol period copied as the cyclic prefix.

In some examples of the method, apparatuses, and non-transitory computer-readable medium described herein, transmitting the indication of the first cyclic prefix configuration may include operations, features, means, or instructions for transmitting the indication of the first cyclic prefix configuration that indicates a length of the first guard interval and a length of the second guard interval may be each less than or equal to a length of the cyclic prefix.

In some examples of the method, apparatuses, and non-transitory computer-readable medium described herein, transmitting the indication of the first cyclic prefix configuration may include operations, features, means, or instructions for transmitting the indication of the first cyclic prefix configuration that indicates the first symbol period structure includes a set of multiple consecutive guard intervals located at an end of the symbol period.

In some examples of the method, apparatuses, and non-transitory computer-readable medium described herein, each guard interval may be of a length equal to the length of the cyclic prefix and a last guard interval of the set of multiple consecutive guard intervals may be included in the portion of the symbol period copied as the cyclic prefix.

In some examples of the method, apparatuses, and non-transitory computer-readable medium described herein, the first symbol period structure further includes an additional guard interval that may be of a length that may be less than the length of the cyclic prefix and may be located immediately before the set of multiple consecutive guard intervals.

In some examples of the method, apparatuses, and non-transitory computer-readable medium described herein, transmitting the indication of the first cyclic prefix configuration may include operations, features, means, or instructions for transmitting the indication of the first cyclic prefix configuration that indicates to interleave that a symbol having the first symbol period structure with a second symbol having a second symbol structure that differs from the first symbol period structure.

Some examples of the method, apparatuses, and non-transitory computer-readable medium described herein may further include operations, features, means, or instructions for communicating a delay spread measurement report that indicates the delay spread, where the indication of the first cyclic prefix configuration may be based on the delay spread measurement report.

In some examples of the method, apparatuses, and non-transitory computer-readable medium described herein, transmitting the indication of the first cyclic prefix configuration may include operations, features, means, or instructions for transmitting the indication of the first cyclic prefix configuration that indicates the first symbol period structure includes a set of one or more guard intervals, a quantity of one or more guard intervals, or both.

In some examples of the method, apparatuses, and non-transitory computer-readable medium described herein, transmitting the indication of the first cyclic prefix configuration may include operations, features, means, or instructions for transmitting the indication of the first cyclic prefix configuration that indicates the first symbol period structure includes a set of one or more guard intervals based on a prior cyclic prefix configuration that associates the first symbol period structure with the set of the one or more guard intervals.

In some examples of the method, apparatuses, and non-transitory computer-readable medium described herein, transmitting the indication of the first cyclic prefix configuration may include operations, features, means, or instructions for transmitting the indication of the first cyclic prefix configuration that indicates the first cyclic prefix configuration may be applicable to a set of subcarrier spacing values, may be inapplicable to one or more other subcarrier spacing values, or both.

In some examples of the method, apparatuses, and non-transitory computer-readable medium described herein, transmitting the indication of the first cyclic prefix configuration may include operations, features, means, or instructions for transmitting the indication of the first cyclic prefix configuration that indicates the first cyclic prefix configuration may be applicable to a first subcarrier spacing.

Some examples of the method, apparatuses, and non-transitory computer-readable medium described herein may further include operations, features, means, or instructions for transmitting an indication that the UE may be to derive a second cyclic prefix configuration for a second subcarrier spacing based on the first cyclic prefix configuration and a delay spread capability of the UE associated with the first cyclic prefix configuration.

In some examples of the method, apparatuses, and non-transitory computer-readable medium described herein, the indication of the first cyclic prefix configuration may be transmitted via control signaling.

In some examples of the method, apparatuses, and non-transitory computer-readable medium described herein, the first cyclic prefix configuration may be applicable to uplink communications, downlink communications, or both.

DETAILED DESCRIPTION

As wireless communications systems move to higher frequency bands, subcarrier spacing (SCS) may be increased for use in the higher bands (e.g., due to fast Fourier transform (FFT) size considerations). As SCS is increased, a length of a cyclic prefix (CP) used may decrease. For example, a CP length may be inversely proportional to the SCS. A shortened CP length may, however, result in a reduced delay spread handling capacity. However, simply increasing the length of the CP may cause symbols to no longer be aligned with slot boundaries. As such, an alternate CP design that increases delay spread handling capacity without affecting slot alignment may be useful.

A wireless communications system may employ the use of guard intervals (GIs) to increase the delay spread handling capability without increasing the length of the CP itself. For example, a user equipment (UE) may communicate with a network entity in accordance with a cyclic prefix configuration that indicates a symbol period structure for a symbol period. The symbol period structure may indicate that the UE is to include at least a portion of a GI in the symbol period prior to a portion of the symbol period that is copied for use as a CP for the symbol period.

By using such a symbol structure, the delay spread handling capability of the wireless communications system may be increased due to the increased length of the symbol structure included in the configurations without increasing the length of the CP itself or affecting slot alignment. Additionally, overhead associated with these configurations only depends on the additional desired delay spread handling capability and there is no fixed overhead. Additionally, as GIs may be used in the symbol period structure, such GIs may offer increased flexibility compared to CPs, as the GIs may use various different sequences, data, or information (e.g., data for acquisition of time, frequency, or phase lock, or any combination thereof) and the GIs may be used for various different purposes (e.g., time, frequency, or phase tracking, channel estimation, providing for a beam-switching gap, or any combination thereof), whereas a CP includes repetitions of data that cannot be used for other purposes. Further, because different sets, configurations, or arrangements of GIs may be used, communications flexibility is increased and scaling for desired delay spread handling capabilities becomes trivial.

Aspects of the disclosure are initially described in the context of wireless communications systems. Aspects of the disclosure are then described with reference to symbol structure schemes, a wireless communications system, a symbol period structures, and a process flow. Aspects of the disclosure are further illustrated by and described with reference to apparatus diagrams, system diagrams, and flowcharts that relate to cyclic prefix guard interval for increased delay spread.

Figure 1:
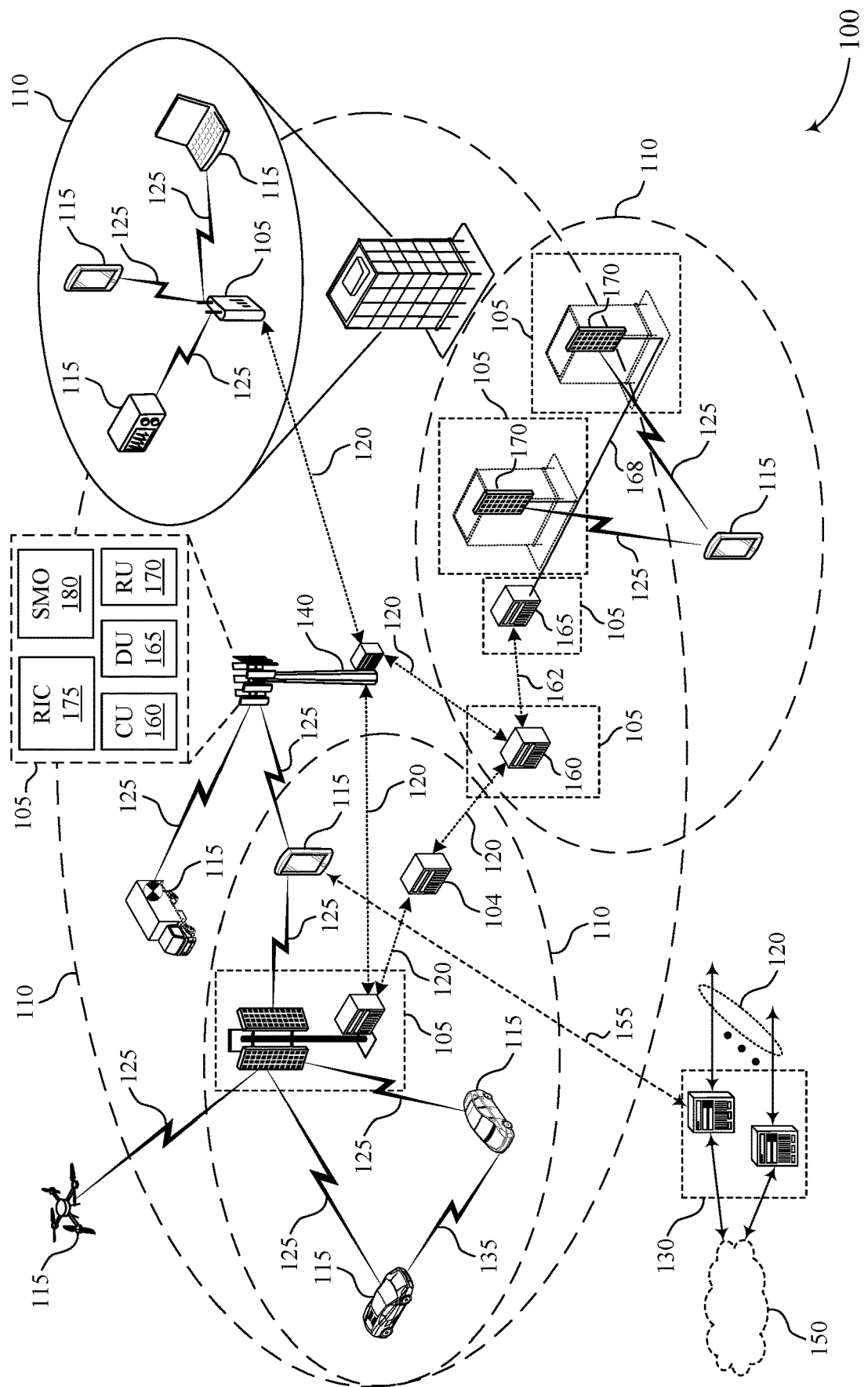
FIG. 1 illustrates an example of a wireless communications system that supports cyclic prefix guard interval for increased delay spread in accordance with one or more examples as disclosed herein.

FIG. 1 illustrates an example of a wireless communications system 100 that supports cyclic prefix guard interval for increased delay spread in accordance with one or more examples as disclosed herein. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support cyclic prefix guard interval for increased delay spread as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications.

The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In some implementations, the wireless communications system 100 (e.g., including the UE 115 and the network entity 105) may employ the use of GIs to increase the delay spread handling capability without increasing the length of the CP itself. In some examples, a CP configuration may include a first GI portion located at an end of a symbol period in a portion of a symbol period that is copied for use as the CP and a second GI portion located immediately before the portion of the symbol period that is copied for use as the CP. The two GI portions may be separated by a data portion included in the portion of the symbol period copied for use as the CP. In other examples, a CP configuration may include a plurality of repetitions of a GI portion (e.g., one or more of which may be of a length equal to the length of the CP) included in the symbol period to increase the delay spread handling capability as much as desired. In some examples, different sets, configurations, or selections of GIs (e.g., complete GIs, partial GIs, or both) may be used. In some examples, the GIs themselves may be used for various other purposes, including beam switching or frequency, phase, or non-linearity tracking.

Figure 2A:
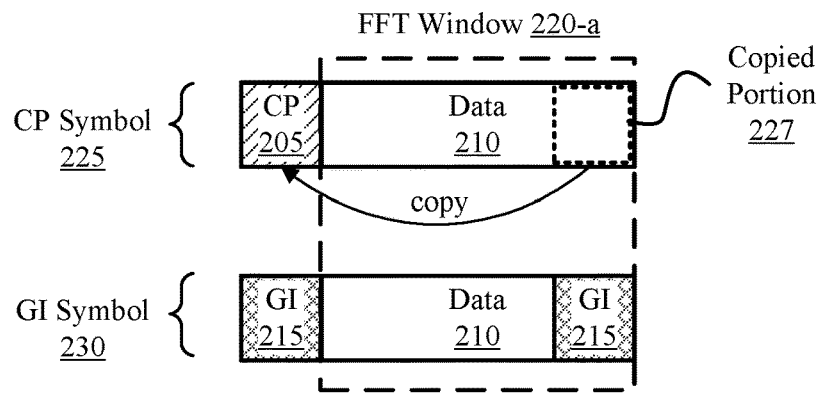
FIGS. 2A, 2B, and 2C illustrate examples of symbol structure schemes that support cyclic prefix guard interval for increased delay spread in accordance with one or more examples as disclosed herein.
Figure 2B:
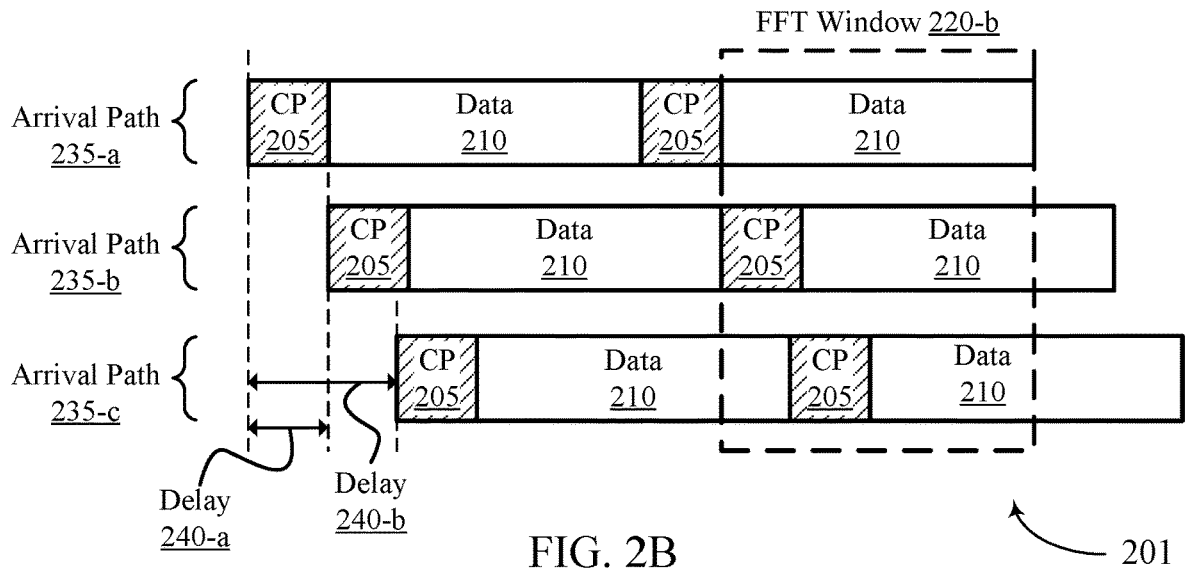
Figure 2C:
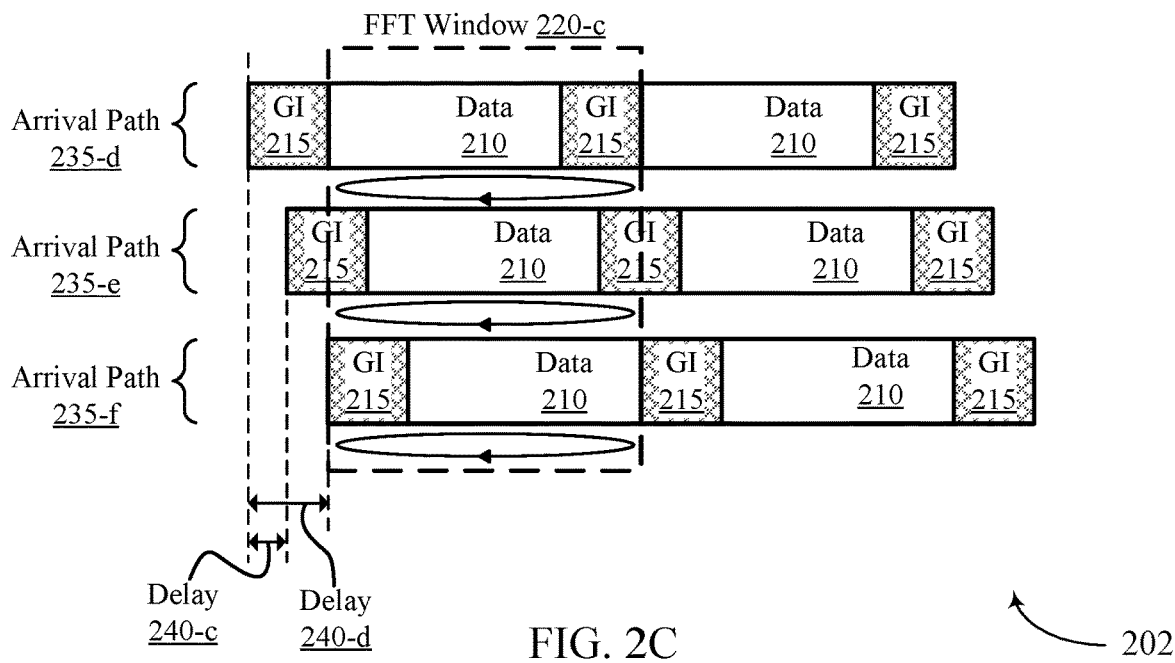

FIGS. 2A, 2B, and 2C illustrate examples of symbol structure scheme 200, symbol structure scheme 201, and symbol structure scheme 202 that support cyclic prefix guard interval for increased delay spread in accordance with one or more examples as disclosed herein.

FIG. 2A depicts symbol structure scheme 200 that may include a CP symbol 225 and a GI symbol 230. In the CP symbol 225, the copied portion 227 of the data 210 may be copied and used as the CP 205. As such, in some examples, the CP 205 may be data dependent (e.g., the data included in the CP 205 depends on or includes the same data from the copied portion 227). In the CP symbol 225, the CP 205 is located outside of the FFT window 220-a, and is used to maintain the integrity of circular convolution.

The GI symbol 230 includes the GI 215. In contrast to the CP symbol 225, the GI 215 is located inside the FFT window 220-a and may not be data dependent. For example, the GI 215 may include different types of data or may serve different purposes, such as "filler" values (e.g., all zeros, all ones, or other values not associated with the data 210); data for acquisition of time, frequency, or phase lock; time, frequency, or phase tracking; channel estimation; providing for a beam-switching gap; or any combination thereof. A GI 215 may be added to any communication waveform (e.g., a single carrier waveform, an OFDM waveform, or other waveforms). In some examples, the type of GI 215 used may depend on or may be based on the waveform to which the GI 215 is to be added. By using the same GI 215 sequence across different symbols (e.g., consecutive symbols), the integrity of circular convolution may be maintained (e.g., in a multipath scenario) while reducing inter-symbol interference, inter-channel interference, or both.

As wireless communications systems begin to utilize some frequency bands (e.g., 100 GHz and above), SCS values may be increased (e.g., to aid in maintaining an associated FFT size. Such SCS values may also aid in mitigation of increased phase noise characteristics at some frequency bands. In some examples, a CP length may be inversely proportional to a SCS. For example, as the SCS increases, the CP length may be reduced. Such reduced CP lengths may be associated with reduced delay spread (DS) handling capabilities. Since, in some examples, a longest permissible delay path that conforms with the DS handling capabilities may cause the CP to fall within a FFT window, a DS handling capability may be further reduced. Due to at least these factors, in some cases, a DS handling capability at some frequency bands may be reduced.

For example, as depicted in the symbol structure scheme 201 of FIG. 2B, various arrival paths 235 may carry signals that may be delayed at various delays 240. A first-received or non-delayed signal may be transmitted over arrival path 235-a, and subsequently delayed signals may be transmitted over arrival path 235-b and arrival path 235-c. Arrival path 235-b may be associated with delay 240-a relative to arrival path 235-a and arrival path 235-c may be associated with delay 240-b relative to arrival path 235-a. Arrival path 235-b may represent a delay path that is a largest interference-free delay path and circular convolution may be maintained, because, though the signal is delayed, the delay 240-a is not longer than the CP length of the CP 205 and no portion of the preceding symbol encroaches into the FFT window 220-b. In contrast, arrival path 235-c may introduce excessive delay or interference and circular convolution may not be maintained, as the delay 240-b is longer than a length of the CP 205. As such, the CP 205 of the arrival path 235-c (e.g., the data 210 of the preceding symbol) was pushed beyond the beginning of the FFT window 220-b and a portion of the preceding symbol is now present in the FFT window 220-b.

Similarly, as depicted in the symbol structure scheme 202 of FIG. 2C, a GI 215 may be employed to handle some multipath delays. Arrival path 235-d may be a first-received path with no delay, arrival path 235-e may be associated with delay 240-c, and arrival path 235-f may be associated with delay 240-d. As shown, the use of the GI 215 may handle a multipath delay up to a delay that is the length of the GI 215 itself. For example, delay 240-d associated with arrival path 235-f is the same as the length of GI 215. In such a case, there may be minimal or no interference from other symbols, as the GI 215 from a previous symbol (e.g., a GI 215 that is pushed into the FFT window 220-c due to delay of an arrival path 235) may be used to maintain circular convolution. For example, in arrival path 235-e associated with delay 240-c that is approximately one half of the length of the GI 215, the second half of the first GI 215 and the first half of the second GI 215, when combined in the circular convolution operation, include the same contents as a complete GI 215, thereby maintaining integrity of the circular convolution operation. Similarly, in arrival path 235-f associated with the delay 240-d that is approximately the same length as the GI 215, even though the second GI 215 is pushed beyond the FFT window 220-c, the first GI 215 is pushed into the FFT window 220-c and is available for use in the circular convolution operation.

Figure 3:
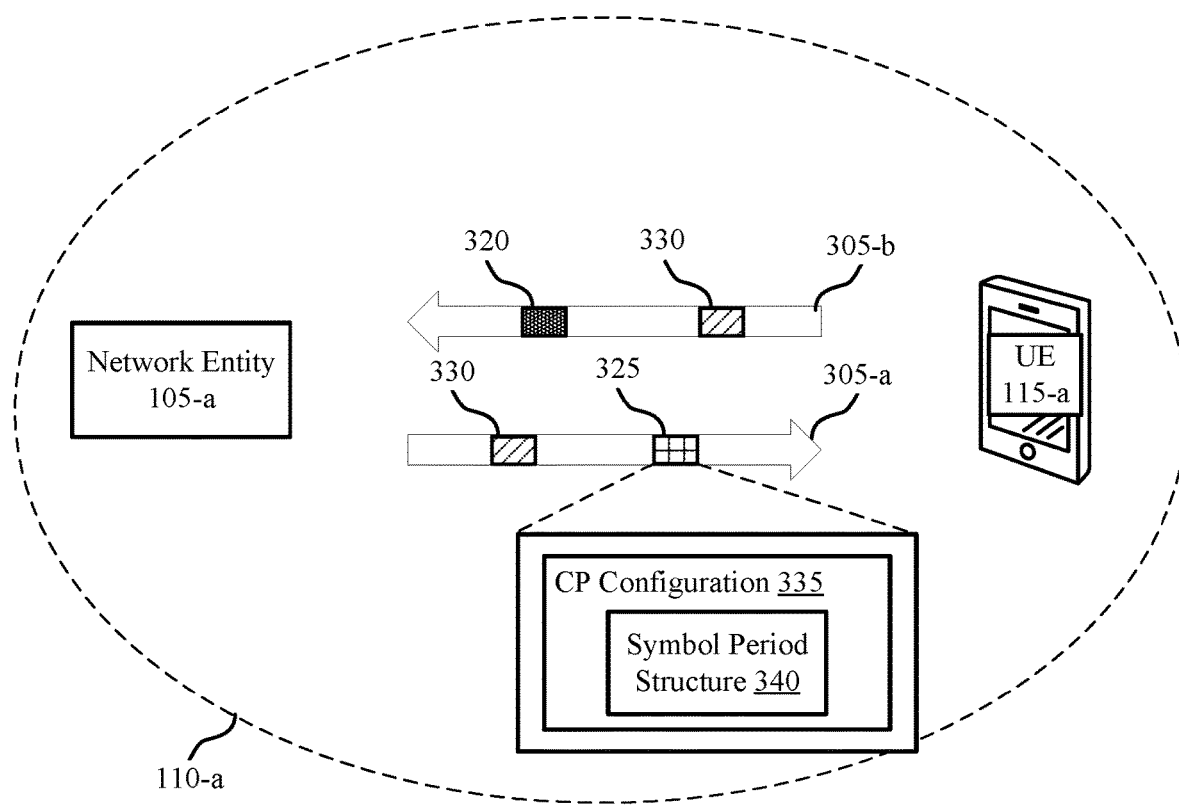
FIG. 3 illustrates an example of a wireless communications system that supports cyclic prefix guard interval for increased delay spread in accordance with one or more examples as disclosed herein.

FIG. 3 illustrates an example of a wireless communications system 300 that supports cyclic prefix guard interval for increased delay spread in accordance with one or more examples as disclosed herein. The wireless communications system 300 may include the network entity 105-a, which may be an example of one or more network entities discussed in relation to other figures. The wireless communications system 300 may include the UE 115-a, which may be an example of one or more UEs discussed in relation to other figures.

In some examples, the UE 115-a may be located in a geographic coverage area 110-a that may be associated with the network entity 105-a. The network entity 105-a and UE 115-a may communicate via one or more downlink communication links 305-a and one or more uplink communication links 305-b.

The UE 115-a may transmit the CP configuration capability message 320 to the network entity 105-a. The CP configuration capability message 320 may indicate that the UE 115-a is capable of communicating in accordance with a CP configuration 335, a symbol period structure 340, or both.

The network entity 105-a may transmit the CP configuration indication 325 to the UE 115-a. The CP configuration indication 325 may indicate the symbol period structure 340. The symbol period structure 340 may indicate or include one or more GIs that are to occur in a symbol period. For example, the symbol period structure 340 may indicate at least a fraction of a GI that is to occur in the symbol period before a portion of the symbol period that is to be copied for use as a CP for the symbol period structure 340. In some examples, the symbol period structure 340 or one or more elements included or indicated in the symbol period structure 340 may be based on a delay spread, such as a delay spread associated with transmissions to or from the UE 115-a.

The UE 115-a and the network entity 105-a may communicate with one another via one or more data communications 330. Such data communications 330 may be transmitted in accordance with the CP configuration 335, the symbol period structure 340, or both. For example, the UE 115-a and the network entity 105-a may communicate the data communications 330 using one or more symbols that may employ the symbol period structure 340 that may include at least a portion of a GI in the symbol period structure 340.

Through these techniques, other techniques described herein, or both, the delay spread handling capability of the wireless communications system 300 may be increased due to the symbol period structure 340 included in the CP configuration 335 without increasing the length of the CP itself or affecting slot alignment. Further, overhead for such a scheme may depend on the additional desired delay spread handling capability (e.g., without a fixed overhead). Further, because different sets, configurations, or arrangements of whole GIs, partial GIs, or both, may be used, communications flexibility is increased and scaling for desired delay spread handling capabilities is straightforward (e.g., by increasing a quantity of whole or partial GIs included in the symbol period structure 340).

In some examples, a symbol generated or transmitted in accordance with the symbol period structure 340 may be interleaved with a symbol that does not contain a GI (e.g., the CP symbol 225 depicted in FIG. 2A and FIG. 2B), a symbol that contains a GI (e.g., in place of a CP, such as GI symbol 230 depicted in FIG. 2C), or a hybrid CP/GI symbol. For example, the symbol 420-a or symbol 420-b depicted in FIG. 4 or the symbol 520-a or the symbol 520-b depicted in FIG. 5 are examples of symbols that may be interleaved with a symbol without a GI, a symbol with a GI, or a hybrid CP/GI symbol. Such interleaving may be performed in the same slot or may be performed in different slots.

In some examples, the network entity 105-a may request that the UE 115-a transmit a DS measurement report. The DS measurement report may include one or more indications of DS associated with communications of the UE 115-a. For example, such a DS may be an amount of delay between different arrival paths in a multipath delay scenario. For example, a first (e.g., non-delayed) arrival path may receive a series of symbols, each associated with an FFT window. This same series of symbols may also be received through a second arrival path, but the series of symbols may be delayed, and the difference in arrival times between the two arrival paths may be referred to as a DS. In some cases, a receiving device may receive a first symbol (e.g., along the first, non-delayed, arrival path) and may establish an FFT window for processing the first symbol. However, if the DS between the first and second arrival paths is sufficiently large, the reception of the series of symbols along the second arrival path may be delayed and a portion of a previous symbol (e.g., a symbol located before the first symbol in the series of symbols) may fall within the time period defined by the FFT window for processing the first symbol. As such, data from multiple symbols may be received at the same time, causing inter-symbol interference.

The network entity 105-a may select the CP configuration 335 based on the DS measurement report. For example, the network entity 105-a may select a CP configuration 335 that includes a DS handling capability that is greater than or equal to a DS indicated in the DS measurement report. Such a DS handling capability may indicate an amount of DS (e.g., a duration of time delay between multiple arrival paths) that may occur in a multipath delay scenario without the presence of inter-symbol interference (e.g., when the network entity 105-a and the UE 115-a are communicating in accordance with a CP configuration 335, a symbol period structure 340, or both). Thus, in some examples, the network entity 105-a may select or configure a CP configuration 335 (e.g., that includes such a DS handling capability) such that a duration, in time, of one or more CPs, one or more GIs, or both, that are indicated in the CP configuration 335 may be greater than or equal to a DS. For example, the network entity 105-a may select one or more time durations or lengths of one or more GIs included in the symbol period structure 340 based on the DS measurement report (e.g., one or more DSs indicated in the DS measurement report) such that the duration (e.g., in time) of the one or more GIs in the symbol period is greater than or equal a DS indicated in the DS measurement report.

In some examples, the network entity 105-a may indicate a GI sequence (e.g., data or values that are to be included in one or more GIs) that is to be included in one or more GIs indicated in the symbol period structure 340 (e.g., so that a receiving device may know which GI is to be used for communications). For example, the network entity 105-a may indicate (e.g., to the UE 115-a) that the symbol period structure 340 is to include one or more GIs that contain a first data sequence or set of values. For example, GIs may include different types of data, such as "filler" values (e.g., all zeros, all ones, or other values not associated with the data 210), data for acquisition of time, frequency, or phase lock, or any combination thereof. Additionally, or alternatively, GIs may include data, values, or information for one or more operations, such as time, frequency, or phase tracking, channel estimation, providing for a beam-switching gap, or any combination thereof.

In some examples, GI sequences included in one or more GIs may be different for different CP configurations 335, symbol period structures 340, or both. By including different GI sequences in different situations, reception properties of the symbols may be adjusted for improved reception. For example, different GI sequences may be used based on an amount of DS. As such, in some examples, a GI sequence to be included in one or more GIs may be signaled or indicated explicitly (e.g., by the network entity 105-a to the UE 115-a). Such signaling may be control signaling, RRC signaling, DCI signaling, MAC-CE signaling, or any combination thereof.

Additionally, or alternatively, the data or information to be included in the one or more GIs may be implicitly indicated. For example, the GI sequence to be included in the one or more GIs may be determined or selected based on a prior CP configuration 335, symbol period structure 340, prior signaling (e.g., implicit or explicit) of prior data or information to be included in one or more prior GIs, or any combination thereof. Such prior signaling may link the symbol period structure 340 to the data or information to be included in the one or more GIs.

In some examples, the network entity 105-a may indicate a length of time of one or more GIs (e.g., that may be the same length of time as a DS), a quantity of GIs to be included in the symbol period structure 340 (e.g., based on the length of time of a DS), or both. For example, the network entity 105-a may indicate a time duration of a DS that may be associated with communications between the network entity 105-a and the UE 115-a. The UE 115-a may then expect to receive symbols in downlink transmissions that have a symbol structure (e.g., the symbol period structure 340) that may tolerate the time duration of the DS or may transmit uplink transmissions to the network entity 105-a using the symbol period structure 340 that may tolerate the time duration of the DS. As such, the UE 115-a may select or generate the symbol period structure 340 (e.g., for receiving downlink transmissions, transmitting uplink transmissions, or both) based on the configured DS handling capability, a SCS, a length of a CP, or any combination thereof. For example, the UE 115-a may select a CP configuration 335 with a symbol period structure 340 that may include a DS handling capability greater than or equal to the configured DS handling capability received from the network entity 105-a.

Additionally, or alternatively, the network entity 105-a may indicate the one or more lengths, quantities, or both directly (e.g., in terms of integer quantities of GIs, a quantity of samples for a length of one or more GIs, or both). For example, the network entity 105-a may indicate {2 GI, 128 samples} to the UE 115-a, meaning that the symbol period structure 340 is to include two GIs (e.g., two GIs with length equal to a length of the CP, such as the GIs 425 or the GIs 525, discussed in relation to FIGS. 4 and 5, respectively), an additional GI portion with a length of 128 samples (e.g., such as GI 527) and that a DS handling capability (e.g., the DS capability 450 or the DS capability 550, discussed in relation to FIGS. 4 and 5, respectively) of the symbol period structure 340 is to be of a length equal to $2*CP_{length}+128$ samples (e.g., where the $CP_{length}$ may be a length of the CP 430-a or the CP 530-a, discussed in relation to FIGS. 4 and 5, respectively). Additionally, or alternatively, the network entity 105-a may indicate {128 samples}, meaning that the symbol period structure 340 is to include two GI portions, each of length 128 samples (e.g., GI and a total DS handling capability of $CP_{length}+128$ samples (e.g., where the $CP_{length}$ may be a length of the CP 430-a or the CP 530-a, discussed in relation to FIGS. 4 and 5, respectively).

Further, such indications may explicitly or implicitly indicate a symbol structure scheme or symbol period structure that the UE 115-a is to use for communications. For example, by indicating {2 GI, 128 samples}, the network entity 105-a may be implicitly indicating that the UE 115-a is to employ the use of symbol period structure 500 as described in FIG. 5 (e.g., the UE 115-a may interpret the indication to mean that the UE 115-a is to use the symbol period structure 500). Additionally, or alternatively, by indicating {128 samples}, the network entity 105-a may be implicitly indicating that the UE 115-a is to employ the use of symbol period structure 400 as described in FIG. 4 (e.g., the UE 115-a may interpret the indication to mean that the UE 115-a is to use the symbol period structure 400).

Figure 4:
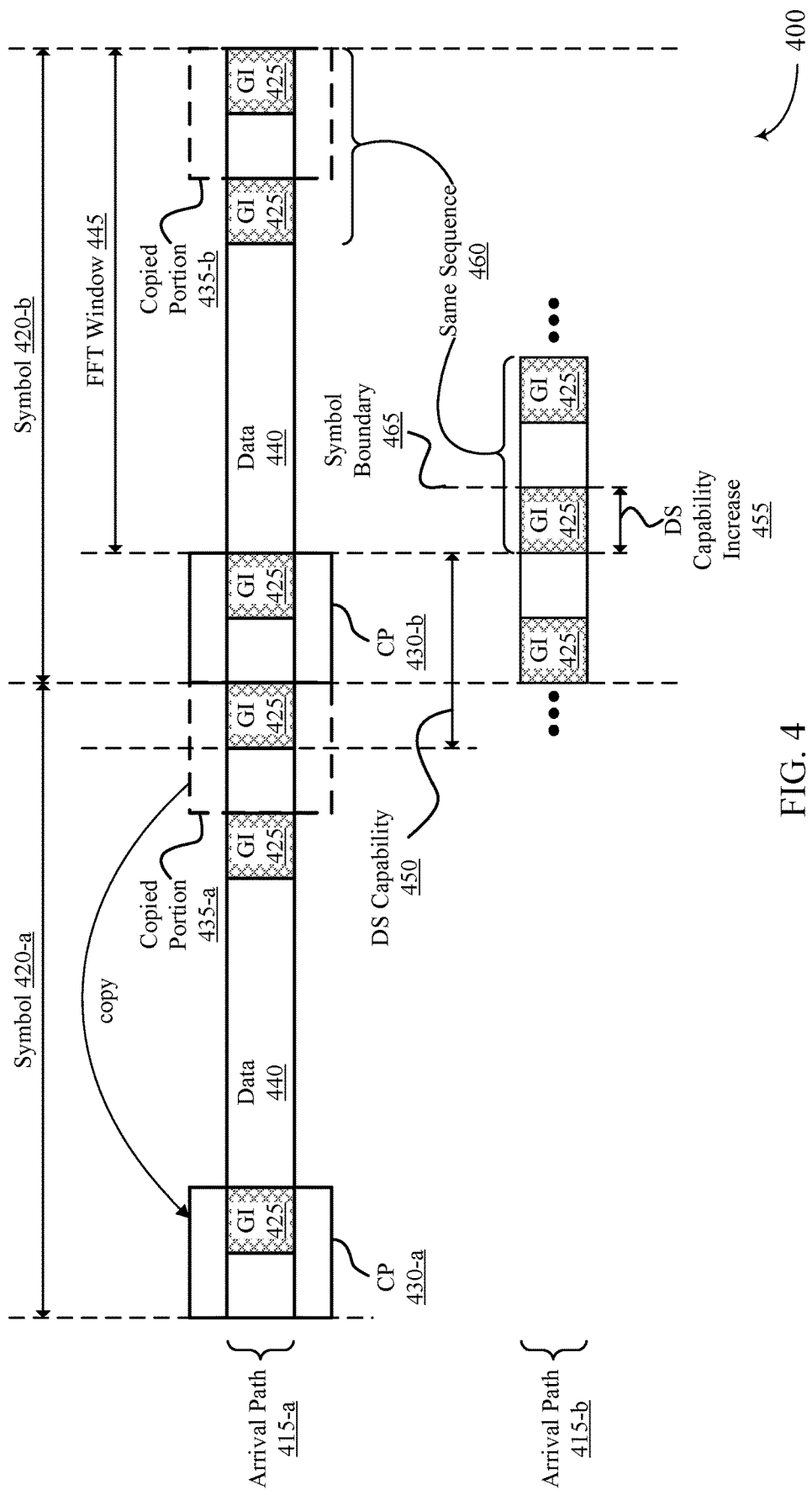
FIG. 4 illustrates an example of a symbol period structure that supports cyclic prefix guard interval for increased delay spread in accordance with one or more examples as disclosed herein.
Figure 5:
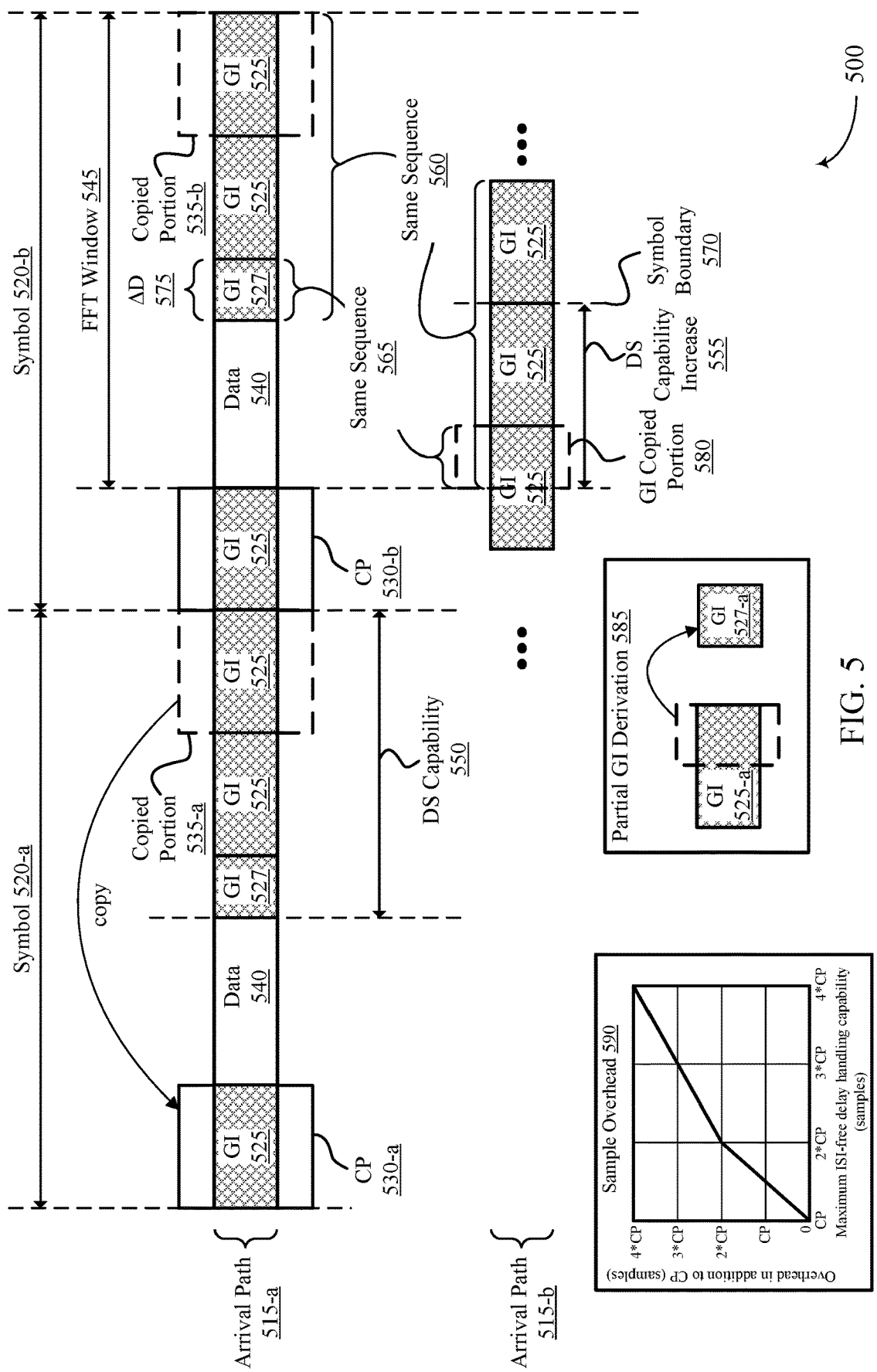
FIG. 5 illustrates an example of a symbol period structure that supports cyclic prefix guard interval for increased delay spread in accordance with one or more examples as disclosed herein.

In some examples, a length of a GI (either a whole or partial GI, such as the GIs 425, the GIs 525, the GIs 527, or any combination thereof, discussed in relation to FIGS. 4 and 5, respectively) included in a CP configuration 335 or a symbol period structure 340 may be a quantized length. Such a quantized length may be based on a length of a CP (e.g., ¼ CP, ½ CP, CP, or other value based on the length of a CP). For example, as depicted in FIG. 5, the GIs 525 may be of a length of a whole (e.g., one) CP 530-a or CP 530-b. Similarly, the GI 527 may be an example of a partial GI (e.g., a GI that is shorter than a length of the GIs 525) and may be of a quantized length, such as a length that is one half the length of the CP 530-a or CP 530-b.

In some examples, the CP configuration 335, the symbol period structure 340, or both may apply to some SCSs and may not apply to other SCSs. For example, the CP configuration 335, the symbol period structure 340, or both may apply to an SCS where a length of a CP for such an SCS may not offer sufficient DS handling capability (e.g., where a length of a CP may equal or fall below a DS handling capability metric or threshold).

In some examples, the network entity 105-a may configure the UE 115-a to use a particular SCS for communications between the network entity 105-a and the UE 115-a. As such, the UE 115-a may implicitly identify a symbol period structure 340 for communications based on the SCS, as the SCS may be associated with the symbol period structure 340. In other words, by configuring the UE 115-a to use the SCS, the network entity 105-a may also be implicitly indicating (e.g., based on the SCS with which the UE 115-a is configured) the symbol period structure 340 that the UE 115-a is to use.

In some examples, an amount or time duration of DS associated with communications between the network entity 105-a and the UE 115-a may be independent of an SCS used for the communications. For example, the network entity 105-a may indicate that the UE 115-a is to derive the symbol period structure 340 (e.g., select a symbol period structure 340) such that communications associated with a second SCS (e.g., 1920 kHz) may employ a symbol period structure 340 that may tolerate the same time duration of DS that a symbol period structure 340 associated with a first SCS (e.g., 960 kHz) may tolerate.

FIG. 4 illustrates an example of a symbol period structure 400 that supports cyclic prefix guard interval for increased delay spread in accordance with one or more examples as disclosed herein. The symbol period structure 400 may be described in relation to an arrival path 415-a and a delayed arrival path 415-*b* that may be arrival paths of a multipath arrival scenario. The arrival path 415-*a* may include a symbol 420-*a* and a symbol 420-*b*. Though these symbols are depicted as an example, the techniques described herein may be applied to any quantity of symbols 420.

In some examples, a network entity may indicate (e.g., to a UE) a CP configuration. The CP configuration may indicate a symbol period structure, such as the symbol period structure 400 that may include one or more GIs 425 that may aid in allowing communications between the network entity and the UE to tolerate an increased DS. In some examples, the CP configuration may indicate other information related to the CP or the symbol period structure 400. For example, the CP configuration may indicate that the symbol period structure 400 is applicable or is not applicable to communications using one or more particular SCSs, that the UE is to derive or select the symbol period structure 400 based on another symbol period structure associated with a different SCS. In some examples, the CP configuration may be transmitted via control signaling, such as RRC signaling, MAC-CE signaling, physical layer signaling, or any combination thereof.

In the symbol period structure 400, a symbol (e.g., the symbol 420-*a* or the symbol 420-*b*) may include a CP 430 and a copied portion 435 that is copied to form the CP 430. For example, the symbol 420-*a* includes the CP 430-*a* and the copied portion 435-*a*, and the symbol 420-*b* includes the CP 430-*b* and the copied portion 435-*b*. A symbol may include data 440 (e.g., data that is to be transmitted to another device).

The symbol may further include one or more GIs 425. In some examples, one or more of the GIs 425 may be of a length that is less than the length of the CP 430-*a*. For example, the length of the GIs 425 in FIG. 4 may be approximately one-half the length of the CP 430-*a*, though the symbol period structure 400 may be used with GIs 425 of any length. For example, the symbol period structure 400 may include one or more GIs 425 of a length less than or equal to the length of a CP, such as CP 530-*a*. In some examples, such a length of a GI (e.g., GI 425, GI 525, GI 527, one or more other GIs, or any combination thereof) may be considered a fractional length in that such a length may be a fraction of a length of the CP. Such a length of the CP 430-*a*, the GIs 425, or both, may be a length measured in samples, in time, or in another unit of measurement. In some examples, each GI 425 may include the same data sequence or content.

In some examples, the GI 425 may be a portion of the CP 430-*a* and the length of the GI 425 may therefore be a fraction of the length of the CP 430-*a*. In other words, the GI 425 may be a known sequence found within the CP 430-*a* (or other CP described herein) and this known sequence may be included one or more times within the FFT window 445 (e.g., at least one of which may be included in the FFT window 445 before copied portion 435-*b* or the CP 430-*b*).

In the example symbol period structure 400 depicted in FIG. 4, a GI 425 is included immediately before the copied portion 435-*a* and another GI 425 is included at the end of the symbol (which may be within the copied portion 435-*a*). By including these GIs 425 in this way, a symmetric "GI-data-GI" structure may be located at the end of the symbol 420-*a*. This symmetric structure allows the integrity of circular convolution operations to hold, as the same "GI-data-GI" sequence "wraps around" within the FFT window 445 even when an arrival path is delayed (e.g., as shown by the same sequence 460 highlighted within the FFT window 445).

Arrival path 415-*b* depicts an arrival path that is delayed as compared to arrival path 415-*a*. However, even though arrival path 415-*b* is delayed (e.g., as shown by the difference between the symbol boundary 465 and the boundary between symbol 420-*a* and symbol 420-*b* of the arrival path 415-*a*), the "GI-data-GI" sequence is still present within the FFT window 445 and the same sequence 460 is present in both arrival path 415-*a* and arrival path 415-*b*.

The DS capability 450 represents a DS handling capability of the symbol period structure 400. As depicted in FIG. 4, the DS capability 450 is equal to the length of the CP 430 plus the length of the GI 425, and may indicate how much DS (e.g., a time duration) that may be tolerated in communications employing the symbol period structure 400. In some examples, such a DS capability 450 may be less than or equal to two times the length of the CP 430. The DS capability increase 455 represents an additional length or amount of time included in the DS capability 450 as compared to other approaches that do not utilize the symbol period structure 400. In other words, the DS capability increase 455 may represent an amount of additional DS that may be tolerated in communications employing the symbol period structure 400 beyond an amount of DS that may be tolerated by a symbol period structure that does not include the GIs 425.

FIG. 5 illustrates an example of a symbol period structure 500 that supports cyclic prefix guard interval for increased delay spread in accordance with one or more examples as disclosed herein. The symbol period structure 500 may be described in relation to an arrival path 515-*a* and a delayed arrival path 515-*b* that may be arrival paths of a multipath arrival scenario. The arrival path 515-*a* may include a symbol 520-*a* and a symbol 520-*b*. Though these symbols are depicted as an example, the techniques described herein may be applied to any quantity of symbols 520.

In some examples, a network entity may indicate (e.g., to a UE) a CP configuration. The CP configuration may indicate a symbol period structure, such as the symbol period structure 500 that may include one or more GIs 525, one or more GIs 527, or any combination thereof, that may aid in allowing communications between the network entity and the UE to tolerate an increased DS. In some examples, the CP configuration may indicate other information related to the CP or the symbol period structure 500. For example, the CP configuration may indicate that the symbol period structure 500 is applicable or is not applicable to communications using one or more particular SCSs, that the UE is to derive or select the symbol period structure 500 based on another symbol period structure associated with a different SCS. In some examples, the CP configuration may be transmitted via control signaling, such as RRC signaling, MAC-CE signaling, physical layer signaling, or any combination thereof.

In the symbol period structure 500, a symbol (e.g., the symbol 520-*a* or the symbol 520-*b*) may include a CP 530 and a copied portion 535 that is copied to form the CP 530. For example, the symbol 520-*a* includes the CP 530-*a* and the copied portion 535-*a*, and the symbol 520-*b* includes the CP 530-*b* and the copied portion 535-*b*. A symbol may include data 540 (e.g., data that is to be transmitted to another device).

The symbol may further include one or more GIs 525. In some examples, one or more of the GIs 525 may be of a length equal to the length of the CP 530. In the example symbol period structure 500 depicted in FIG. 5, multiple GIs 525 may be included in the symbol 520-*a*. For example, a GI 525 may be located in the copied portion 535-*a* that is copied to form the CP 530-*a*. Further, at least a portion of a GI 525 may be included in the symbol 520-*a* before the copied portion 535-*a*. In some examples, GIs 525 that are of the length of the CP 530-*a* may be included in the symbol 520-*a*, the symbol 520-*b*, or both. In some examples, another GI 527 that may be of a length less than the length of the CP 530-*a* may be included in the symbol 520-*a*, the symbol 520-*b*, or both. For example, as shown in the partial GI derivation 585, the GI 527-*a* may be a fractional portion of the GI 525-*a*, such as an end of the GI 525-*a*. As such, the GI 527-*a* may include a corresponding portion of the GI sequence included in GI 525-*a*. Similarly, the GI 527 may be a fractional portion of the GI 525 and may include a corresponding portion of the GI sequence included in GI 525. In some examples, both one or more GIs 525 that are of the same length of the CP 530-*a* and one or more GIs 527 that are of a length less than the length of the CP 530-*a* may be included in the symbol 520-*a*, the symbol 520-*b*, or both. This structure of GIs 525 (and optionally GIs 527) allows the integrity of circular convolution operations to hold, as the same GI sequence "wraps around" within the FFT window 545 even when an arrival path is delayed (e.g., as shown by the same sequence 560 highlighted within the FFT window 445, as well as by the same sequence 565).

The AD 575 may represent or correspond to a difference between a combined length of one or more CP-length GIs 525 and a time duration of DS that may be present in communications. Additionally, or alternatively, the AD 575 may represent or correspond to a length of the GI 527, which may be a partial or fractional GI. In some examples, a partial GI, such as the GI 527, be of the length AD 575 such that the combined length of the GIs 525 and the GI 527 of a single symbol (e.g., symbol 520-*b*) may be equal to or greater than the time duration of the DS present in the communications. As such, in some examples the DS capability 550 (e.g., which may be designed or configured to be of a length greater than or equal to a DS present in communications) may be of a length that is equal to two times the length of the CP 530-*b* plus the length of the AD 575.

In some examples, a total DS capability (e.g., DS capability 550) of the symbol structure 500 (or other example symbol structures) may be different than the actual DS (e.g., a measured DS or a DS received from another device) in the communication system. For example, a DS may be equal to 100 ns, but a DS capability (e.g., DS capability 550) may only be 80 ns, and an MCS used may be one that may sustain or handle some inter-symbol interference with an acceptable or minimal degradation in block error rate. As such, the total DS capability (e.g., DS capability 550) may be configured to match or correspond to a desired DS capability for a symbol as needed for communications and may not be the same as or correspond to an actual DS present in a communication system. Thus, AD 575 may, in some examples, be described as or correspond to a length of a partial GI (e.g., GI 527) and may not be the same as the actual DS in the system.

For example, a measured DS may be of a length that falls between two CP lengths and three CP lengths (e.g., where a CP length is a length of CP 530-*b*), such 2.5 CP lengths. In such a scenario, if the symbol period structure 500 included only two CP-length GIs 525, the symbol period structure 500 would not be able to tolerate the DS of 2.5 CP lengths. Using three GIs 525 would allow the symbol period structure 500 to tolerate the DS of the length of 2.5 CPs 530-*b*, but may involve increased overhead or a reduced amount of time within the FFT window 545 for the data 540. As such, the symbol period structure 500 may include the GI 527 that may correspond to the length AD 575 and the length of the GIs 525 and the GI 527 combined (e.g., which may be represented by the DS capability 550) may be greater than or equal to the length of the DS, thereby tolerating the DS and reducing or eliminating inter-symbol interference or other complications that may arise from DS.

Arrival path 515-*b* depicts an arrival path that is delayed as compared to arrival path 515-*a*. However, even though arrival path 515-*b* is delayed (e.g., as shown by the difference between the symbol boundary 570 and the boundary between symbol 520-*a* and symbol 520-*b* of the arrival path 515-*a*), set of GIs 525 (and optionally the GI 527) is still present within the FFT window 545 and the same sequence 560 is present in both arrival path 515-*a* and arrival path 515-*b*. Similarly, in those cases that may include the GI 527, the same sequence 565 may be present in the GI 527 and a portion of the GI 525, since, in some cases, the GI 527 that is of a length less than a length of the CP 530 may be the same as a portion of a GI 525 that is of a length of the CP 530. In other words, the information included in the GI 527 may also be included in a portion of the GI 525. For example, the copied portion 580 may be a copy of information included in the GI 527 or the GI 527-*a*, which information itself may be a copy of information included in the GI 525 or the GI 525-*a*. Thus, even if GI 527 is a different fractional portion of the GI 525 (the GI copied portion 580 necessarily being of the different fractional portion), the GI 527 and the GI copied portion 580 include the same portions of a GI sequence, thus preserving or supporting the integrity of the circular convolution used in connection with the FFT window 545.

The DS capability 550 represents a DS handling capability of the symbol period structure 500. As depicted in FIG. 5, the DS capability 550 is equal to the length of the two times the length of the CP 530 plus the length of any additional GIs added (including one or more GIs 525, one or more GIs 527, or both) before the last two GIs 525 of a symbol 520, and may indicate how much DS (e.g., a time duration) that may be tolerated in communications employing the symbol period structure 500. For example, as shown in FIG. 5, the DS capability 550 may be equal to two times the length of the CP 530 (which is also the length of the GI 525) plus the length of GI 527. The DS capability increase 555 represents an additional length or amount of time included in the DS capability 550 as compared to some other approaches that do not utilize the symbol period structure 500. In other words, the DS capability increase 555 may represent an amount of additional DS that may be tolerated in communications employing the symbol period structure 500 beyond an amount of DS that may be tolerated by a symbol period structure that does not include the GIs 525, GI 527, or both.

By using the GIs 525 (and optionally the GI 527), the DS capability 550 (also referred to as a DS handling capability) may be extended (e.g., beyond a DS capability of two times the length of a CP as described in some examples relating to FIG. 4). In some examples, depending on a DS that is to be handled, a quantity of GIs 525 (and optionally the GI 527) may be used to adjust or change the symbol period structure 500 to accommodate the DS and provide a DS capability 550 that is greater than or equal to a DS to be handled. For example, an integer quantity of GIs 527 (and optionally one or more GIs 527) may be included in the symbol period structure 500 to adjust or change the DS capability 550 and accommodate a DS to be handled.

By using the symbol period structure 400, the symbol period structure 500, or both, the delay spread handling capability of a wireless communications system may be increased due to the increased length of the symbol structure included in the configurations without increasing the length of the CPs 430 or CPs 530 themselves or affecting slot alignment. Additionally, overhead associated with the symbol period structure 400, the symbol period structure 500, or both, may depend on the additional desired delay spread handling capability and there may be no fixed overhead. For example, the overhead may be piecewise linearly proportional to a desired DS handling capability. In some examples, the overhead associated with the symbol period structure 400, the symbol period structure 500, or both in may follow the sample overhead 590 chart depicted in FIG. 5. Additionally, or alternatively, the sample overhead 590 may follow an equation, such as Equation 1 describing a piecewise linear function, where x is a total DS capability and y is an amount of overhead present beyond the length of a CP (e.g., CP 430 or CP 530).

$$y = \{2(x - CP), CP \le x \le 2*CP, \text{ or } x, x \ge 2*CP\} \quad (1)$$

Additionally, as the GIs 425, GIs 525, GIs 527, or any combination thereof may be used in the symbol period structure, such GIs may offer increased flexibility compared to the use of CPs 430 or CPs 530 without the GIs 425, GIs 525, GIs 527, or any combination thereof, as the GIs 425, GIs 525, GIs 527, or any combination thereof may use various different sequences, data, or information (e.g., data for acquisition of time, frequency, or phase lock, or any combination thereof) and the GIs 425, GIs 525, GIs 527, or any combination thereof may be used for various different purposes (e.g., time, frequency, or phase tracking, channel estimation, providing for a beam-switching gap, or any combination thereof), whereas a CPs 430 or CPs 530 includes repetitions of data that cannot be used for other purposes. Further, because different sets, configurations, or arrangements of the GIs 425, GIs 525, and GIs 527 may be used, communications flexibility is increased and scaling for desired delay spread handling capabilities becomes trivial.

Figure 6:
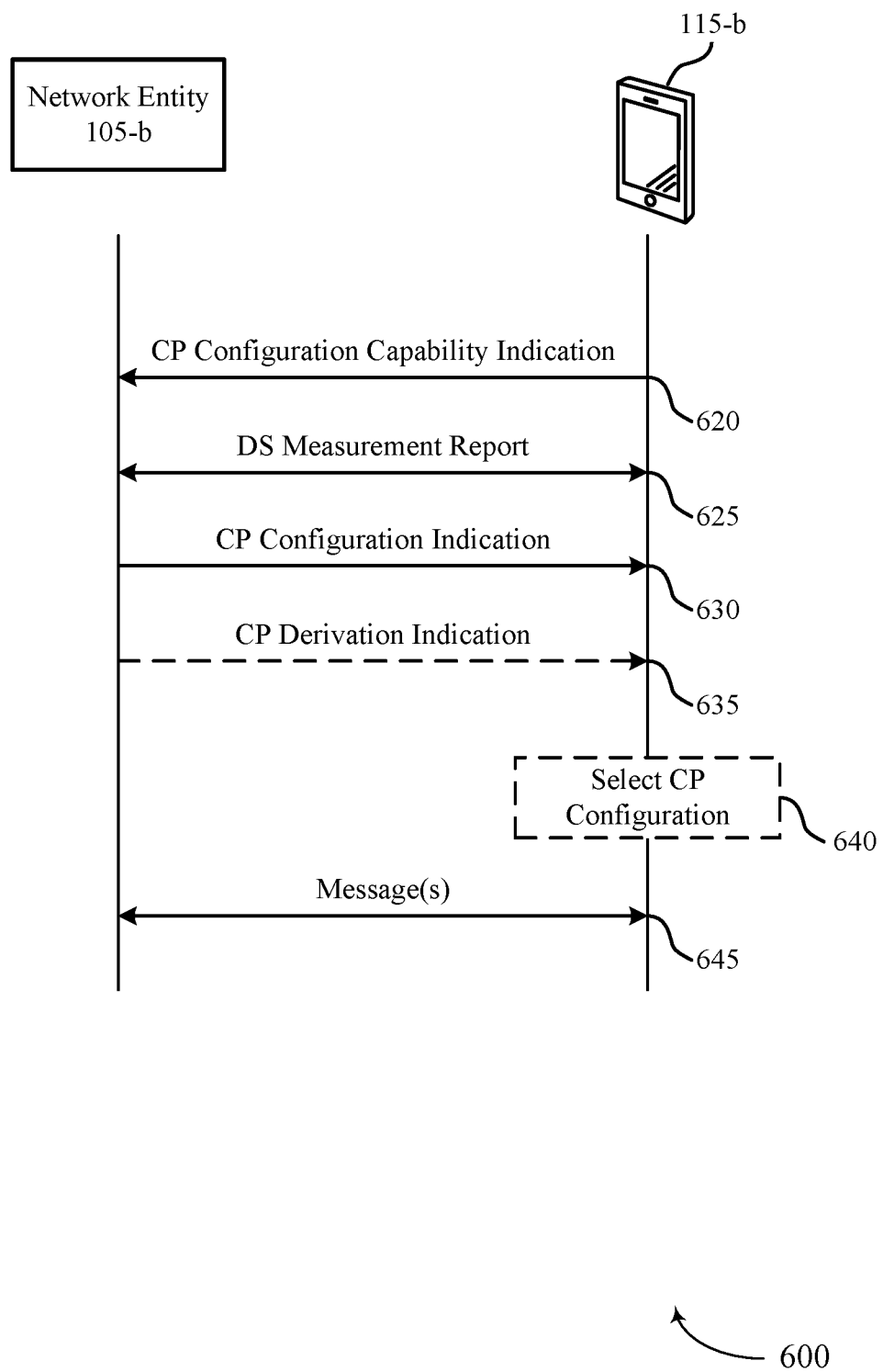
FIG. 6 illustrates an example of a process flow that supports cyclic prefix guard interval for increased delay spread in accordance with one or more examples as disclosed herein.

FIG. 6 illustrates an example of a process flow 600 that supports cyclic prefix guard interval for increased delay spread in accordance with one or more examples as disclosed herein.

The process flow 600 may implement various aspects of the present disclosure described herein. The elements described in the process flow 600 (e.g., the network entity 105-*b* and the UE 115-*b*) may be examples of similarly-named elements described herein.

In the following description of the process flow 600, the operations between the various entities or elements may be performed in different orders or at different times. Some operations may also be left out of the process flow 600, or other operations may be added. Although the various entities or elements are shown performing the operations of the process flow 600, some aspects of some operations may also be performed by other entities or elements of the process flow 600 or by entities or elements that are not depicted in the process flow, or any combination thereof.

At 620, in some examples, the UE 115-*b* may transmit an indication that the UE supports a plurality of cyclic prefix configurations and the network entity 105-*b* may receive the indication. For example, the UE may transmit a message indicating that the UE includes a capability for communications with one or more cyclic prefix configurations (e.g., the CP configuration 335, one or more symbol period structures (e.g., symbol period structure 340, symbol period structure 400, or symbol period structure 500), or both. For example, the UE 115-*b* may indicate that the UE 115-*b* supports the use of the GI 425 in the symbol period structure 400 or that the UE 115-*b* supports the use of GIs 525 and GI 527 in the symbol period structure 500. In some examples, the indication that the UE supports a plurality of cyclic prefix configurations may not be transmitted or received for each symbol communicated. For example, such an indication may be transmitted or received based on or as part of an initial connection and may not be performed after such an initial connection. However, in some examples, a CP configuration or symbol period structure may be changed dynamically (e.g., by the network entity 105-*b*) or based on receiving such a capability indication (e.g., from the UE 115-*b*).

In some examples, a capability to support or not support one or more CP configurations or symbol period structures may be determined, selected, calculated, or otherwise identified (e.g., on an implicit or explicit basis) based on other signaling which is exchanged between the UE 115-*b* and the network entity 105-*b*. For example, the UE 115-*b* may indicate another capability of the UE 115-*b* (e.g., a set of one or more wireless communications capabilities, such as those described in a standards agreement, such as a Third Generation Partnership Project (3GPP) standards release). Additionally, or alternatively, the UE 115-*b* may indicate (e.g., to the network entity 105-*b*) one or more air-interface waveforms supported by the UE 115-*b* (e.g., which may indicate whether a GI-based waveform is supported or not).

At 625, in some examples, the UE 115-*b* may communicate (e.g., transmit, receive, or both) a delay spread measurement report that indicates the delay spread. For example, the UE may receive, from network entity 105-*b*, a delay spread measurement report indicating the delay spread (e.g., measured at the network entity 105-*b*). Additionally, or alternatively, the UE may transmit a delay spread measurement report indicating the delay spread (e.g., measured at the UE 115-*b*) and the network entity 105-*b* may transmit an indication of a cyclic prefix configuration (e.g., the first cyclic prefix configuration) to the UE 115-*b* to use for communications. For example, the UE 115-*b* may receive (e.g., from the network entity 105-*b*) a request for a DS measurement report and the UE 115-*b* may transmit (e.g., based on the request or receiving the request) the DS measurement report.

In some examples, the network entity 105-*b* may transmit a DS measurement report (e.g., regarding an uplink DS associated with communications between the network entity 105-*b* and the UE 115-*b*) to the UE 115-*b*. In some examples, the UE 115-*b* may transmit (e.g., based on the DS measurement report or receiving the DS measurement report) an indication of a CP configuration (e.g., a preferred CP configuration based on the DS or other information indicated in the DS measurement report) to the network entity 105-*b*. Additionally, or alternatively, the UE 115-*b* may measure a DS associated with downlink communications between the UE 115-*b* and the network entity 105-*b* and may transmit an indication of a CP configuration (e.g., a preferred CP configuration based on the measured downlink DS) to the network entity 105-*b*.

In some examples, the DS measurement report may include an indication of a delay spread associated with uplink transmissions from the UE 115-*b*. For example, the indication of the delay spread may be an indication of the delay spread measured at the network entity 105-*b*, at one or more other devices, or any combination thereof. The indication of the delay spread associated with uplink transmissions from the UE 115-*b* may be used by the UE 115-*b* to select (e.g., autonomously or without indication or direction from the network entity 105-*b*) the first cyclic prefix configuration for use in communications (e.g., at 645 of the process flow 600).

At 630, in some examples, the UE 115-*b* may receive, from the network entity 105-*b*, an indication of a first cyclic prefix configuration of the plurality of cyclic prefix configurations. The first cyclic prefix configuration may indicate a first symbol period structure that includes (in some cases, at least a fraction of) a guard interval that occurs in a symbol period prior to a portion of the symbol period copied as a cyclic prefix based on a delay spread exceeding a length of the cyclic prefix. The guard interval may be of a length that may be shorter than the length of the cyclic prefix (e.g., a fractional length of the length of the cyclic prefix), longer than the length of the cyclic prefix, or equal to the length of the cyclic prefix. In some examples, the indication of the first cyclic prefix configuration may apply to uplink communications, downlink communications, or both.

For example, as shown in FIG. 4, the symbol period structure 400 may include multiple GIs 425, which may be of a length less than or equal to the length of a CP 430, such as CP 430-*a* or CP 430-*b*. Such GIs may be referred to as "complete" or "whole" GIs, as they may contain a complete GI sequence.

In other examples, such as the examples shown in FIG. 5, the symbol period structure 500 may include one or more GIs 525 that are of a length of the CP 530 (e.g., which may be "complete" or "whole" GIs that include or contain a complete GI sequence). Further, the symbol period structure 500 may include the GI 527 that may be a fractional portion of the GI 525. For example, as shown in the partial GI derivation 585, the GI 527-*a* may be a fractional portion of the GI 525-*a*. As such, the GI 527-*a* may include a corresponding portion of the GI sequence included in GI 525-*a*. Similarly, the GI 527 may be a fractional portion of the GI 525 and may include a corresponding portion of the GI sequence included in GI 525.

In some examples, the indication of the first cyclic prefix configuration is based on the delay spread measurement report. For example, the first cyclic prefix configuration may indicate a symbol period structure that may include one or more GIs that may collectively be of a time duration that is greater than or equal to a time duration of the delay spread indicated in the delay spread measurement report.

In some examples, the UE 115-*b* may receive the indication of the first cyclic prefix configuration that may indicate the first symbol period structure may have a first guard interval located before the portion of the symbol period copied as the cyclic prefix and a second guard interval located at an end of the portion of the symbol period copied as the cyclic prefix. In some examples, the UE 115-*b* may receive the indication of the first cyclic prefix configuration that may indicate a length of the first guard interval and a length of the second guard interval are each less than or equal to a length of the cyclic prefix.

In some examples, the UE 115-*b* may receive the indication of the first cyclic prefix configuration that may indicate the first symbol period structure includes a plurality of consecutive guard intervals located at an end of the symbol period. In some examples, each guard interval is of a length equal to the length of the cyclic prefix and a last guard interval of the plurality of consecutive guard intervals is comprised in the portion of the symbol period copied as the cyclic prefix. In some examples, the first symbol period structure further includes an additional guard interval that is of a length that is less than the length of the cyclic prefix and is located immediately before the plurality of consecutive guard intervals.

In some examples, the UE 115-*b* may receive the indication of the first cyclic prefix configuration that may indicate to interleave that a symbol having the first symbol period structure with a second symbol having a second symbol period structure that differs from the first symbol period structure.

In some examples, the UE 115-*b* may receive the indication of the first cyclic prefix configuration that may indicate the first symbol period structure may include a set of one or more guard intervals, a quantity of one or more guard intervals, or both.

In some examples, the UE 115-*b* may receive the indication of the first cyclic prefix configuration that may indicate the first symbol period structure may include a set of one or more guard intervals based on a prior cyclic prefix configuration that associates the first symbol period structure with the set of the one or more guard intervals.

In some examples, the UE 115-*b* may receive the indication of the first cyclic prefix configuration that may indicate the first cyclic prefix configuration is applicable to a set of subcarrier spacing values, is inapplicable to one or more other subcarrier spacing values, or both.

In some examples, the UE 115-*b* may receive the indication of the first cyclic prefix configuration that may indicate the first cyclic prefix configuration is applicable to a first subcarrier spacing.

In some examples, the UE 115-*b* may receive the indication of the first cyclic prefix configuration that may indicate quantized values corresponding to one or more lengths of one or more guard intervals of the first symbol period structure.

In some examples, the indication of the first cyclic prefix configuration is transmitted via radio resource control signaling, medium access control control signaling, physical layer control signaling, or any combination thereof.

At 635, in some examples, the UE 115-*b* may receive, from the network entity 105-*b*, an indication that the UE is to derive a second cyclic prefix configuration for a second subcarrier spacing based on the first cyclic prefix configuration and a delay spread capability of the UE associated with the first cyclic prefix configuration. For example, the UE 115-*b* may derive the second cyclic prefix configuration for use in connection with a second SCS (e.g., an SCS of 1920 kHz) based on the first cyclic prefix configuration being used with a first SCS (e.g., an SCS of 960 KHz). In some examples, the second cyclic prefix configuration may be stored and later applied to communications associated with the second SCS. Communications associated with the second SCS (e.g., one or more of the messages communicated at 645) may be performed at least partially overlapping in time with communications associated with the first SCS (e.g., one or more of the messages communicated at 645), such as in a carrier aggregation scenario (e.g., where communications associated with the first SCS may be performed using a first carrier and communications associated with the second SCS may be performed using a second carrier). Additionally, or alternatively, communications associated with the second SCS may be performed in response to or based on a change from the first SCS to the second SCS (e.g., through signaling to the UE 115-*b* by the network entity 105-*b*).

At 640, in some examples, the UE 115-*b* may select the first cyclic prefix configuration based on the indication of the delay spread (e.g. described at 630 of the process flow 600). For example, the first cyclic prefix configuration may be selected (e.g., from the plurality of cyclic prefix configurations supported by the UE 115-*b*, such as the plurality of cyclic prefix indications included in the cyclic prefix configuration capability information at 620 of the process flow 600) based on the first cyclic prefix configuration including a delay spread handling capability that may be greater than or equal to the delay spread indicated in the indication of the delay spread. Such selection of the cyclic prefix configuration may be performed in examples in which the UE 115-*b* does not receive the indication of the first cyclic prefix configuration that is described at 635 in the process flow 600.

At 645, in some examples, the UE 115-*b* may communicate one or more messages with the network entity 105-*b* in accordance with the first cyclic prefix configuration. For example, the UE 115-*b* may transmit one or more messages, receive one or more messages, or both, and such messages may include the symbol period structure indicated in the first cyclic prefix configuration.

Figure 7:
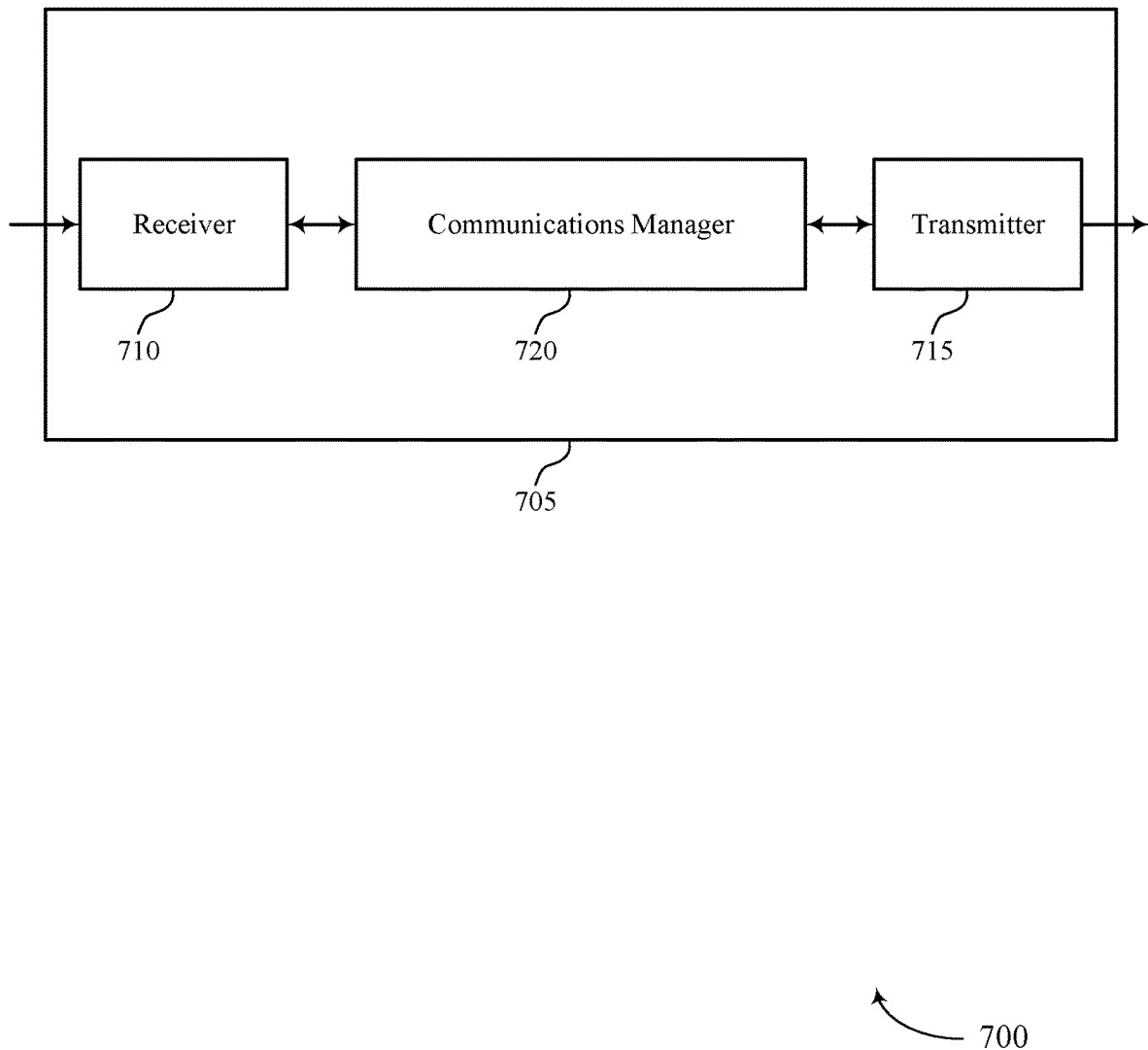
FIGS. 7 and 8 illustrate block diagrams of devices that support cyclic prefix guard interval for increased delay spread in accordance with one or more examples as disclosed herein.

FIG. 7 illustrates a block diagram 700 of a device 705 that supports cyclic prefix guard interval for increased delay spread in accordance with one or more examples as disclosed herein. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to cyclic prefix guard interval for increased delay spread). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to cyclic prefix guard interval for increased delay spread). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of cyclic prefix guard interval for increased delay spread as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 720 may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

Additionally, or alternatively, the communications manager 720 may support wireless communication at a UE in accordance with examples as disclosed herein. For example, the communications manager 720 may be configured as or otherwise support a means for transmitting an indication that the UE supports a set of multiple cyclic prefix configurations. The communications manager 720 may be configured as or otherwise support a means for receiving, from a network entity, an indication of a first cyclic prefix configuration of the set of multiple cyclic prefix configurations, the first cyclic prefix configuration indicating a first symbol period structure that includes (in some cases, at least a fraction of) a guard interval that occurs in a symbol period prior to a portion of the symbol period copied as a cyclic prefix based on a delay spread exceeding a length of the cyclic prefix. The communications manager 720 may be configured as or otherwise support a means for communicating one or more messages with the network entity in accordance with the first cyclic prefix configuration.

By including or configuring the communications manager 720 in accordance with examples as described herein, the device 705 (e.g., a processor controlling or otherwise coupled with the receiver 710, the transmitter 715, the communications manager 720, or a combination thereof) may support techniques for reduced processing, reduced power consumption, more efficient utilization of communication resources, or any combination thereof.

Figure 8:
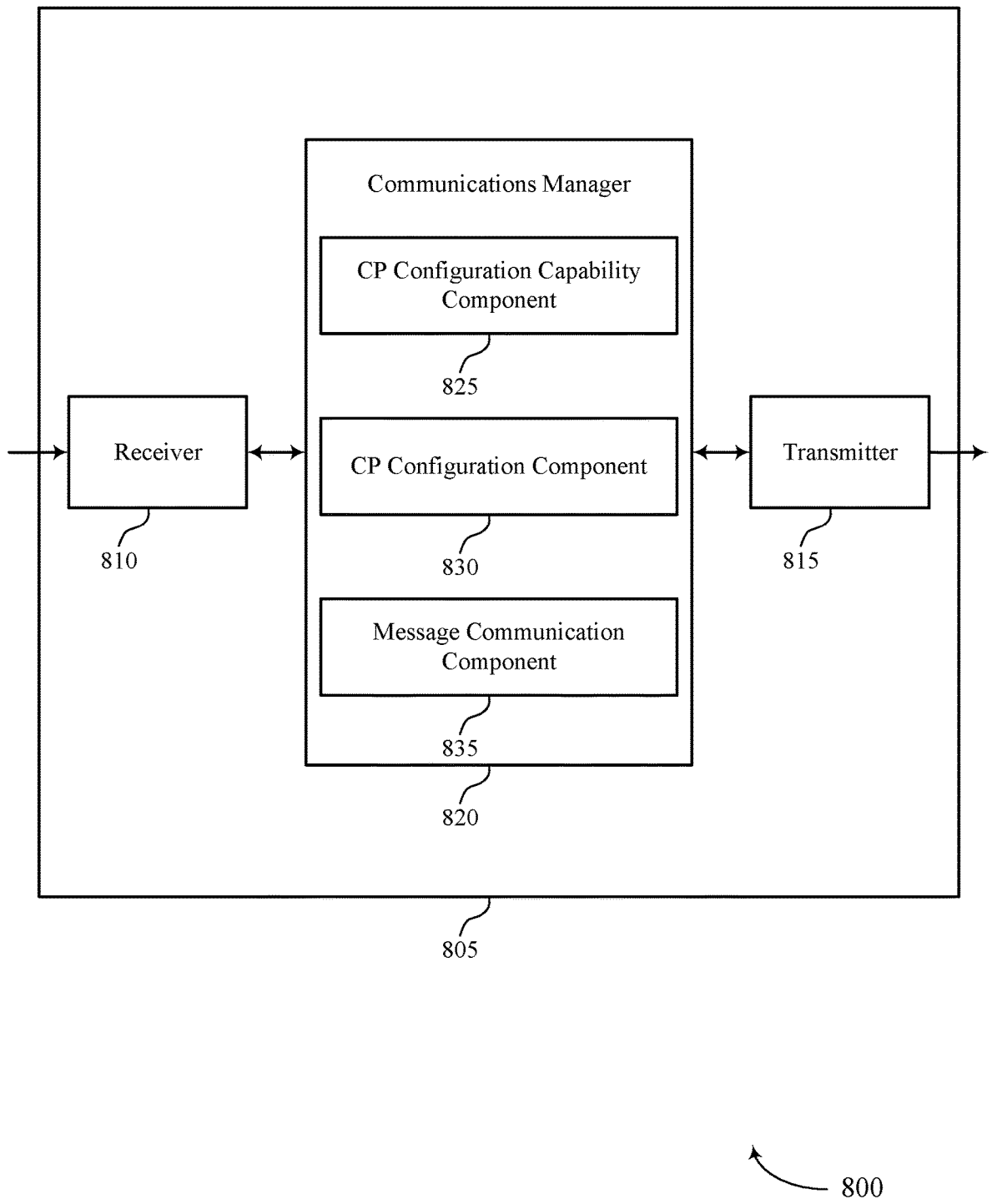

FIG. 8 illustrates a block diagram 800 of a device 805 that supports cyclic prefix guard interval for increased delay spread in accordance with one or more examples as disclosed herein. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to cyclic prefix guard interval for increased delay spread). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to cyclic prefix guard interval for increased delay spread). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of cyclic prefix guard interval for increased delay spread as described herein. For example, the communications manager 820 may include a CP configuration capability component 825, a CP configuration component 830, a message communication component 835, or any combination thereof. The communications manager 820 may be an example of aspects of a communications manager 720 as described herein. In some examples, the communications manager 820, or various components thereof, may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communication at a UE in accordance with examples as disclosed herein. The CP configuration capability component 825 may be configured as or otherwise support a means for transmitting an indication that the UE supports a set of multiple cyclic prefix configurations. The CP configuration component 830 may be configured as or otherwise support a means for receiving, from a network entity, an indication of a first cyclic prefix configuration of the set of multiple cyclic prefix configurations, the first cyclic prefix configuration indicating a first symbol period structure that includes (in some cases, at least a fraction of) a guard interval that occurs in a symbol period prior to a portion of the symbol period copied as a cyclic prefix based on a delay spread exceeding a length of the cyclic prefix. The message communication component 835 may be configured as or otherwise support a means for communicating one or more messages with the network entity in accordance with the first cyclic prefix configuration.

Figure 9:
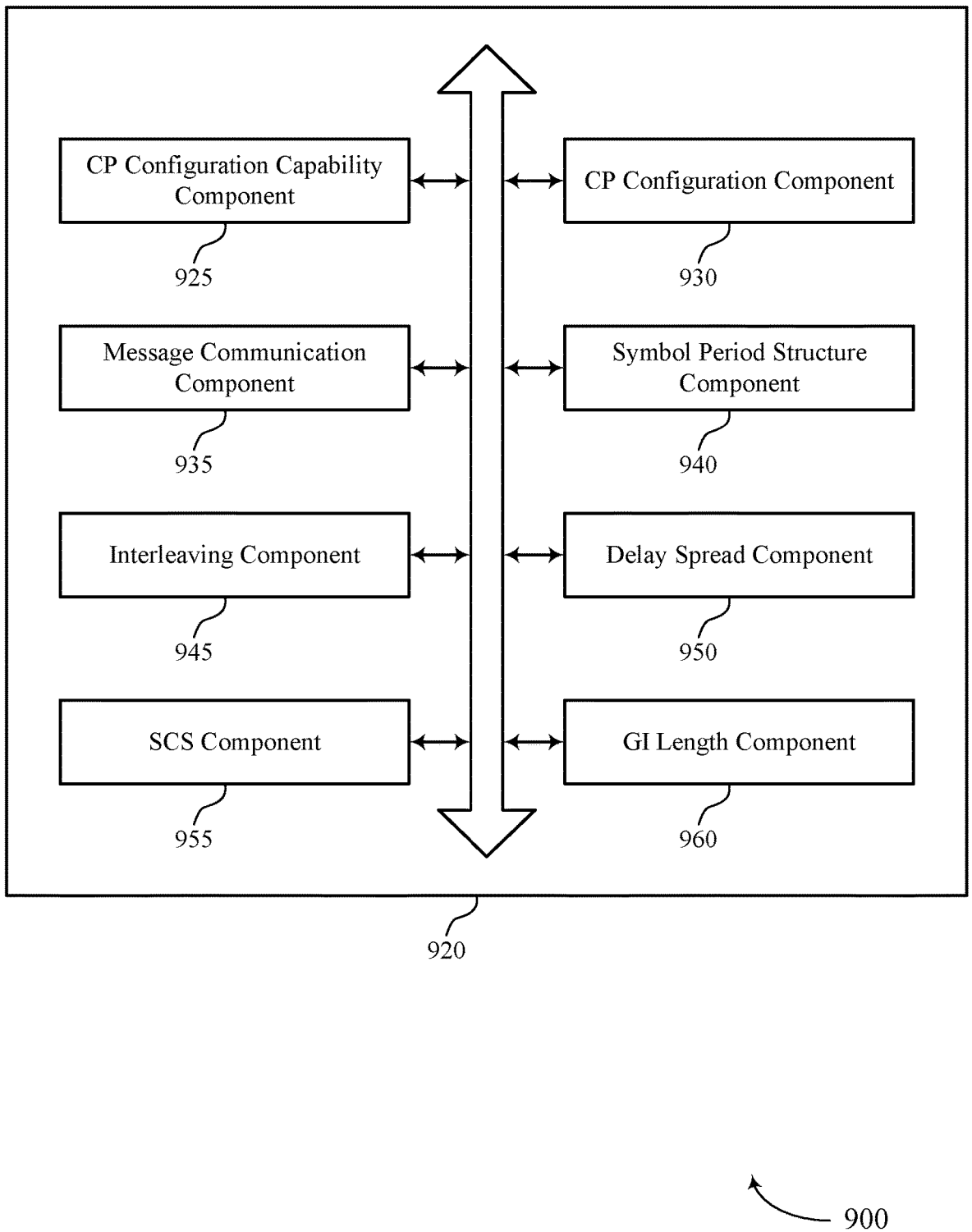
FIG. 9 illustrates a block diagram of a communications manager that supports cyclic prefix guard interval for increased delay spread in accordance with one or more examples as disclosed herein.

FIG. 9 illustrates a block diagram 900 of a communications manager 920 that supports cyclic prefix guard interval for increased delay spread in accordance with one or more examples as disclosed herein. The communications manager 920 may be an example of aspects of a communications manager 720, a communications manager 820, or both, as described herein. The communications manager 920, or various components thereof, may be an example of means for performing various aspects of cyclic prefix guard interval for increased delay spread as described herein. For example, the communications manager 920 may include a CP configuration capability component 925, a CP configuration component 930, a message communication component 935, a symbol period structure component 940, an interleaving component 945, a delay spread component 950, an SCS component 955, a GI length component 960, or any combination thereof. Each of these components may communicate, directly or indirectly, with one another (e.g., via one or more buses).

Additionally, or alternatively, the communications manager 920 may support wireless communication at a UE in accordance with examples as disclosed herein. The CP configuration capability component 925 may be configured as or otherwise support a means for transmitting an indication that the UE supports a set of multiple cyclic prefix configurations. The CP configuration component 930 may be configured as or otherwise support a means for receiving, from a network entity, an indication of a first cyclic prefix configuration of the set of multiple cyclic prefix configurations, the first cyclic prefix configuration indicating a first symbol period structure that includes (in some cases, at least a fraction of) a guard interval that occurs in a symbol period prior to a portion of the symbol period copied as a cyclic prefix based on a delay spread exceeding a length of the cyclic prefix. The message communication component 935 may be configured as or otherwise support a means for communicating one or more messages with the network entity in accordance with the first cyclic prefix configuration.

In some examples, to support receiving the indication of the first cyclic prefix configuration, the symbol period structure component 940 may be configured as or otherwise support a means for receiving the indication of the first cyclic prefix configuration that indicates the first symbol period structure has a first guard interval located before the portion of the symbol period copied as the cyclic prefix and a second guard interval located at an end of the portion of the symbol period copied as the cyclic prefix.

In some examples, to support receiving the indication of the first cyclic prefix configuration, the symbol period structure component 940 may be configured as or otherwise support a means for receiving the indication of the first cyclic prefix configuration that indicates a length of the first guard interval and a length of the second guard interval are each less than or equal to a length of the cyclic prefix.

In some examples, to support receiving the indication of the first cyclic prefix configuration, the symbol period structure component 940 may be configured as or otherwise support a means for receiving the indication of the first cyclic prefix configuration that indicates the first symbol period structure includes a set of multiple consecutive guard intervals located at an end of the symbol period.

In some examples, each guard interval is of a length equal to the length of the cyclic prefix and a last guard interval of the set of multiple consecutive guard intervals is included in the portion of the symbol period copied as the cyclic prefix.

In some examples, the first symbol period structure further includes an additional guard interval that is of a length that is less than the length of the cyclic prefix and is located immediately before the set of multiple consecutive guard intervals.

In some examples, to support receiving the indication of the first cyclic prefix configuration, the interleaving component 945 may be configured as or otherwise support a means for receiving the indication of the first cyclic prefix configuration that indicates to interleave that a symbol having the first symbol period structure with a second symbol having a second symbol structure that differs from the first symbol period structure.

In some examples, the delay spread component 950 may be configured as or otherwise support a means for communicating a delay spread measurement report that indicates the delay spread, where the indication of the first cyclic prefix configuration is based on the delay spread measurement report.

In some examples, to support receiving the indication of the first cyclic prefix configuration, the symbol period structure component 940 may be configured as or otherwise support a means for receiving the indication of the first cyclic prefix configuration that indicates the first symbol period structure includes a set of one or more guard intervals, a quantity of one or more guard intervals, or both.

In some examples, the delay spread component 950 may be configured as or otherwise support a means for receiving an indication of a delay spread associated with uplink transmissions from the UE. In some examples, the CP configuration component 930 may be configured as or otherwise support a means for selecting the first cyclic prefix configuration based on the indication of the delay spread.

In some examples, to support receiving the indication of the first cyclic prefix configuration, the CP configuration component 930 may be configured as or otherwise support a means for receiving the indication of the first cyclic prefix configuration that indicates the first symbol period structure includes a set of one or more guard intervals based on a prior cyclic prefix configuration that associates the first symbol period structure with the set of the one or more guard intervals.

In some examples, to support receiving the indication of the first cyclic prefix configuration, the SCS component 955 may be configured as or otherwise support a means for receiving the indication of the first cyclic prefix configuration that indicates the first cyclic prefix configuration is applicable to a set of subcarrier spacing values, is inapplicable to one or more other subcarrier spacing values, or both.

In some examples, to support receiving the indication of the first cyclic prefix configuration, the SCS component 955 may be configured as or otherwise support a means for receiving the indication of the first cyclic prefix configuration that indicates the first cyclic prefix configuration is applicable to a first subcarrier spacing.

In some examples, the SCS component 955 may be configured as or otherwise support a means for receiving an indication that the UE is to derive a second cyclic prefix configuration for a second subcarrier spacing based on the first cyclic prefix configuration and a delay spread capability of the UE associated with the first cyclic prefix configuration.

In some examples, the indication of the first cyclic prefix configuration is transmitted via radio resource control signaling, medium access control control signaling, physical layer control signaling, or any combination thereof.

In some examples, to support receiving the indication of the first cyclic prefix configuration, the CP configuration component 930 may be configured as or otherwise support a means for receiving the indication of the first cyclic prefix configuration that indicates quantized values corresponding to one or more lengths of one or more guard intervals of the first symbol period structure.

In some examples, the first cyclic prefix configuration is applicable to uplink communications, downlink communications, or both.

Figure 10:
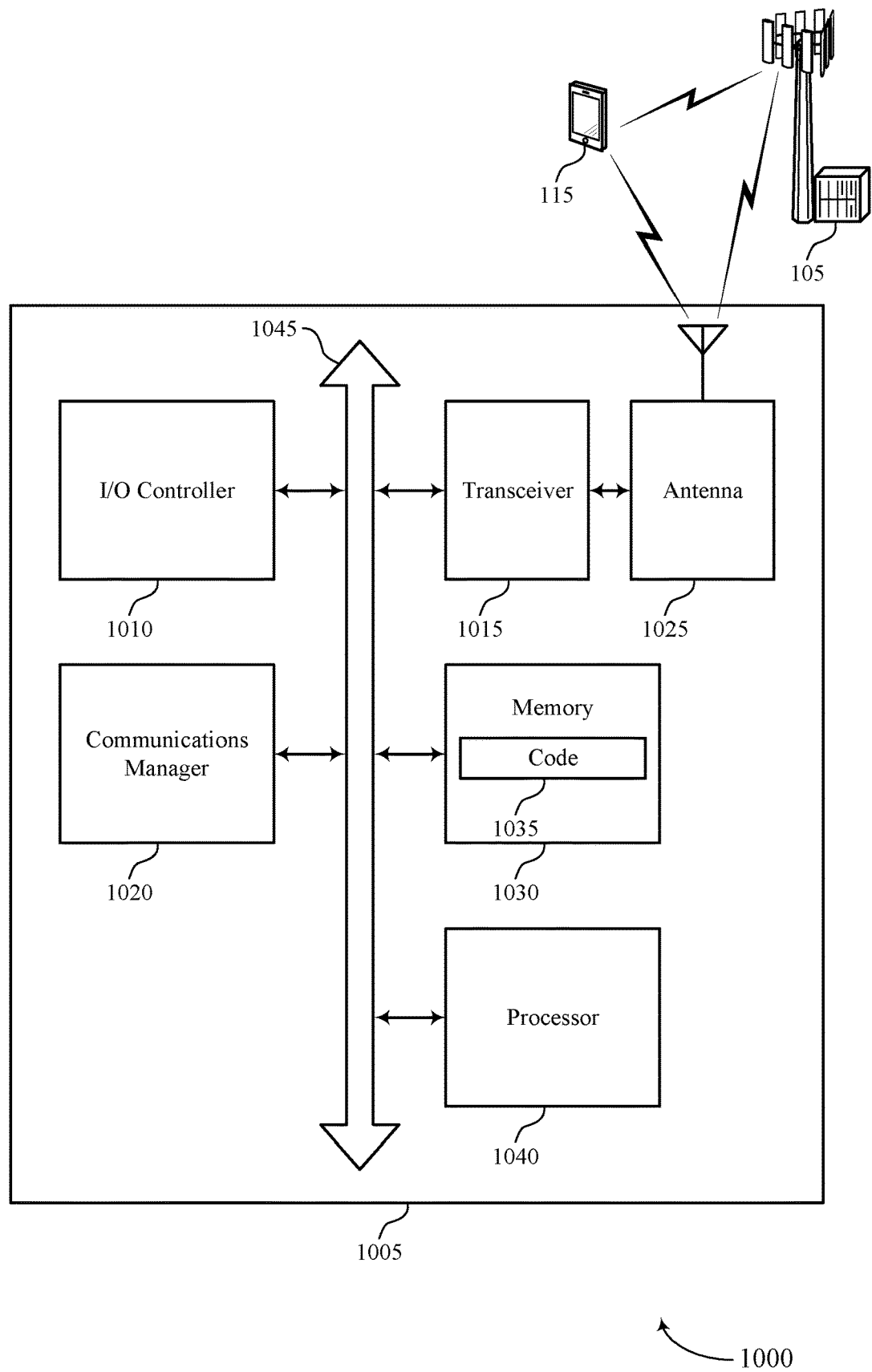
FIG. 10 illustrates a diagram of a system including a device that supports cyclic prefix guard interval for increased delay spread in accordance with one or more examples as disclosed herein.

FIG. 10 illustrates a diagram of a system 1000 including a device 1005 that supports cyclic prefix guard interval for increased delay spread in accordance with one or more examples as disclosed herein. The device 1005 may be an example of or include the components of a device 705, a device 805, or a UE 115 as described herein. The device 1005 may communicate (e.g., wirelessly) with one or more network entities 105, one or more UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally, or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting cyclic prefix guard interval for increased delay spread). For example, the device 1005 or a component of the device 1005 may include a processor 1040 and memory 1030 coupled with or to the processor 1040, the processor 1040 and memory 1030 configured to perform various functions described herein.

Additionally, or alternatively, the communications manager 1020 may support wireless communication at a UE in accordance with examples as disclosed herein. For example, the communications manager 1020 may be configured as or otherwise support a means for transmitting an indication that the UE supports a set of multiple cyclic prefix configurations. The communications manager 1020 may be configured as or otherwise support a means for receiving, from a network entity, an indication of a first cyclic prefix configuration of the set of multiple cyclic prefix configurations, the first cyclic prefix configuration indicating a first symbol period structure that includes (in some cases, at least a fraction of) a guard interval that occurs in a symbol period prior to a portion of the symbol period copied as a cyclic prefix based on a delay spread exceeding a length of the cyclic prefix. The communications manager 1020 may be configured as or otherwise support a means for communicating one or more messages with the network entity in accordance with the first cyclic prefix configuration.

By including or configuring the communications manager 1020 in accordance with examples as described herein, the device 1005 may support techniques for improved communication reliability, reduced latency, improved user experience related to reduced processing, reduced power consumption, more efficient utilization of communication resources, improved coordination between devices, longer battery life, improved utilization of processing capability, or any combination thereof.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of cyclic prefix guard interval for increased delay spread as described herein, or the processor 1040 and the memory 1030 may be otherwise configured to perform or support such operations.

Figure 11:
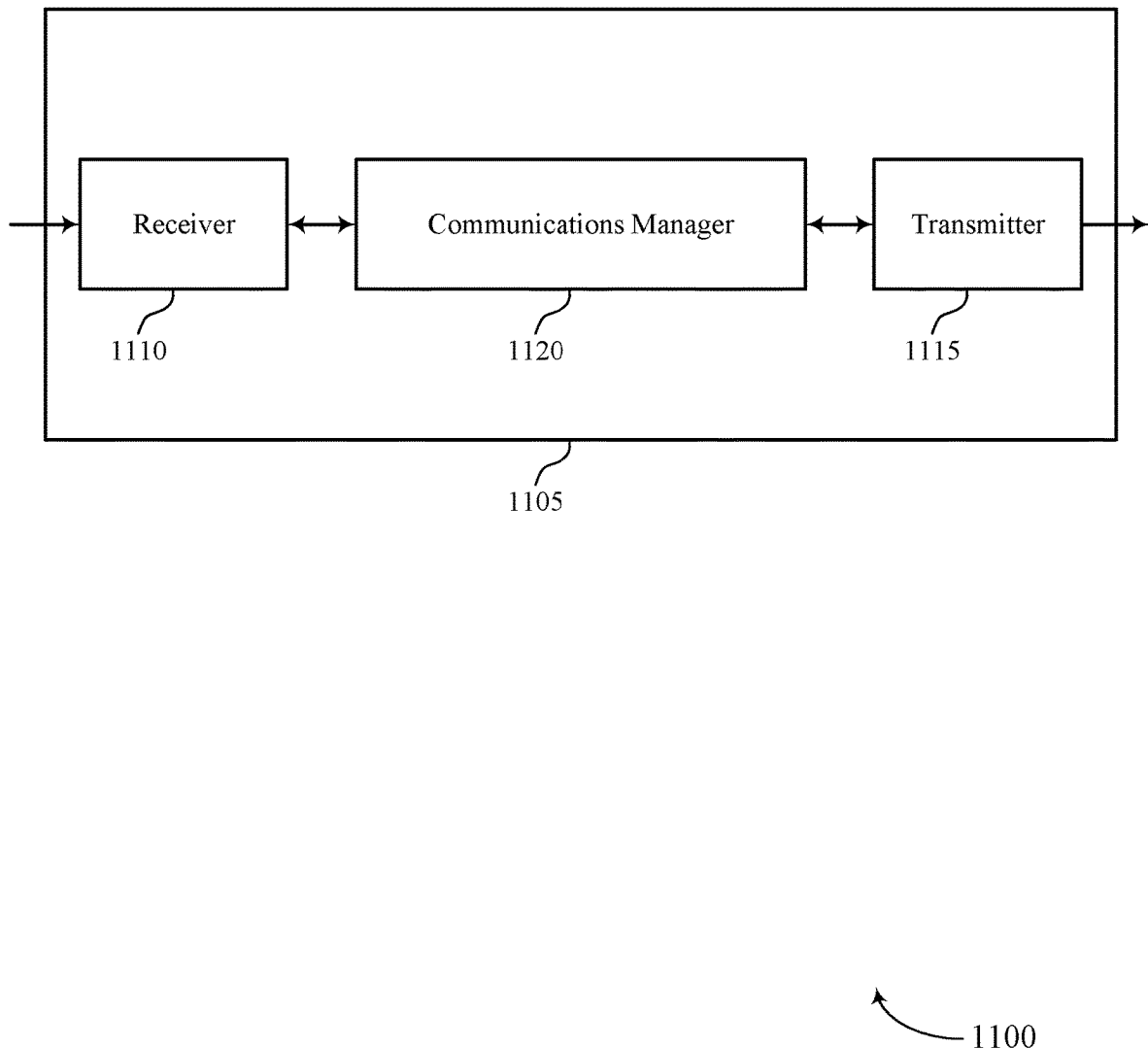
FIGS. 11 and 12 illustrate block diagrams of devices that support cyclic prefix guard interval for increased delay spread in accordance with one or more examples as disclosed herein.

FIG. 11 illustrates a block diagram 1100 of a device 1105 that supports cyclic prefix guard interval for increased delay spread in accordance with one or more examples as disclosed herein. The device 1105 may be an example of aspects of a network entity 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The communications manager 1120, the receiver 1110, the transmitter 1115, or various combinations thereof or various components thereof may be examples of means for performing various aspects of cyclic prefix guard interval for increased delay spread as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1120 may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

Additionally, or alternatively, the communications manager 1120 may support wireless communication at a network entity in accordance with examples as disclosed herein. For example, the communications manager 1120 may be configured as or otherwise support a means for receiving, from a UE, an indication that the UE supports a set of multiple cyclic prefix configurations. The communications manager 1120 may be configured as or otherwise support a means for transmitting, to the UE, an indication of a first cyclic prefix configuration of the set of multiple cyclic prefix configurations, the first cyclic prefix configuration indicating a first symbol period structure that includes (in some cases, at least a fraction of) a guard interval that occurs in a symbol period prior to a portion of the symbol period copied as a cyclic prefix based on a delay spread exceeding a length of the cyclic prefix. The communications manager 1120 may be configured as or otherwise support a means for communicating one or more messages with the UE in accordance with the first cyclic prefix configuration.

By including or configuring the communications manager 1120 in accordance with examples as described herein, the device 1105 (e.g., a processor controlling or otherwise coupled with the receiver 1110, the transmitter 1115, the communications manager 1120, or a combination thereof) may support techniques for reduced processing, reduced power consumption, more efficient utilization of communication resources, or any combination thereof.

Figure 12:
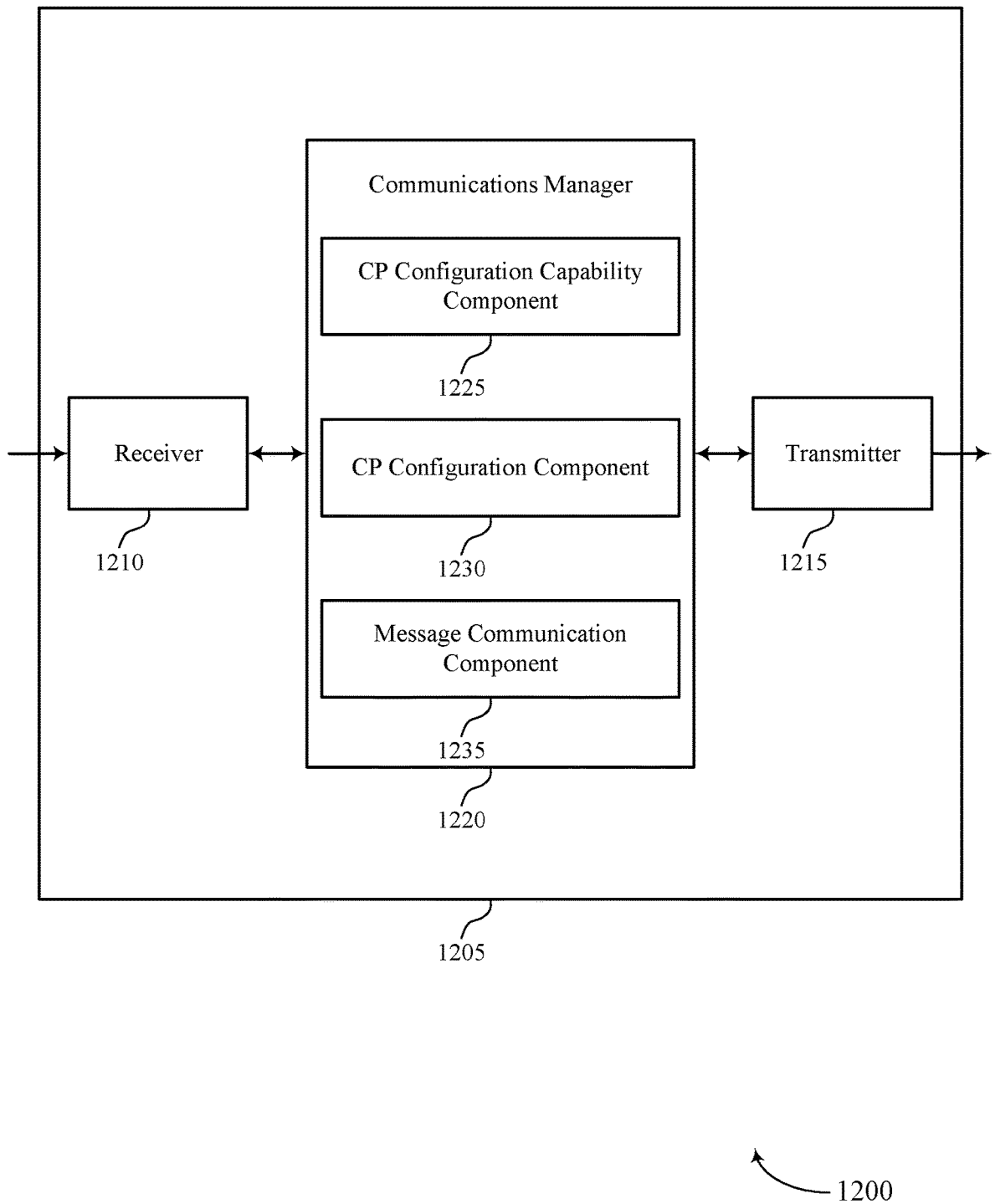

FIG. 12 illustrates a block diagram 1200 of a device 1205 that supports cyclic prefix guard interval for increased delay spread in accordance with one or more examples as disclosed herein. The device 1205 may be an example of aspects of a device 1105 or a network entity 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1205. In some examples, the receiver 1210 may support obtaining information by receiving signals via one or more antennas. Additionally, or alternatively, the receiver 1210 may support obtaining information by receiving signals via one or more wired (e.g., electrical, fiber optic) interfaces, wireless interfaces, or any combination thereof.

The transmitter 1215 may provide a means for outputting (e.g., transmitting, providing, conveying, sending) information generated by other components of the device 1205. For example, the transmitter 1215 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1215 may support outputting information by transmitting signals via one or more antennas. Additionally, or alternatively, the transmitter 1215 may support outputting information by transmitting signals via one or more wired (e.g., electrical, fiber optic) interfaces, wireless interfaces, or any combination thereof. In some examples, the transmitter 1215 and the receiver 1210 may be co-located in a transceiver, which may include or be coupled with a modem.

The device 1205, or various components thereof, may be an example of means for performing various aspects of cyclic prefix guard interval for increased delay spread as described herein. For example, the communications manager 1220 may include a CP configuration capability component 1225, a CP configuration component 1230, a message communication component 1235, or any combination thereof. The communications manager 1220 may be an example of aspects of a communications manager 1120 as described herein. In some examples, the communications manager 1220, or various components thereof, may be configured to perform various operations (e.g., receiving, obtaining, monitoring, outputting, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to obtain information, output information, or perform various other operations as described herein.

The communications manager 1220 may support wireless communication at a network entity in accordance with examples as disclosed herein. The CP configuration capability component 1225 may be configured as or otherwise support a means for receiving, from a UE, an indication that the UE supports a set of multiple cyclic prefix configurations. The CP configuration component 1230 may be configured as or otherwise support a means for transmitting, to the UE, an indication of a first cyclic prefix configuration of the set of multiple cyclic prefix configurations, the first cyclic prefix configuration indicating a first symbol period structure that includes (in some cases, at least a fraction of) a guard interval that occurs in a symbol period prior to a portion of the symbol period copied as a cyclic prefix based on a delay spread exceeding a length of the cyclic prefix. The message communication component 1235 may be configured as or otherwise support a means for communicating one or more messages with the UE in accordance with the first cyclic prefix configuration.

Figure 13:
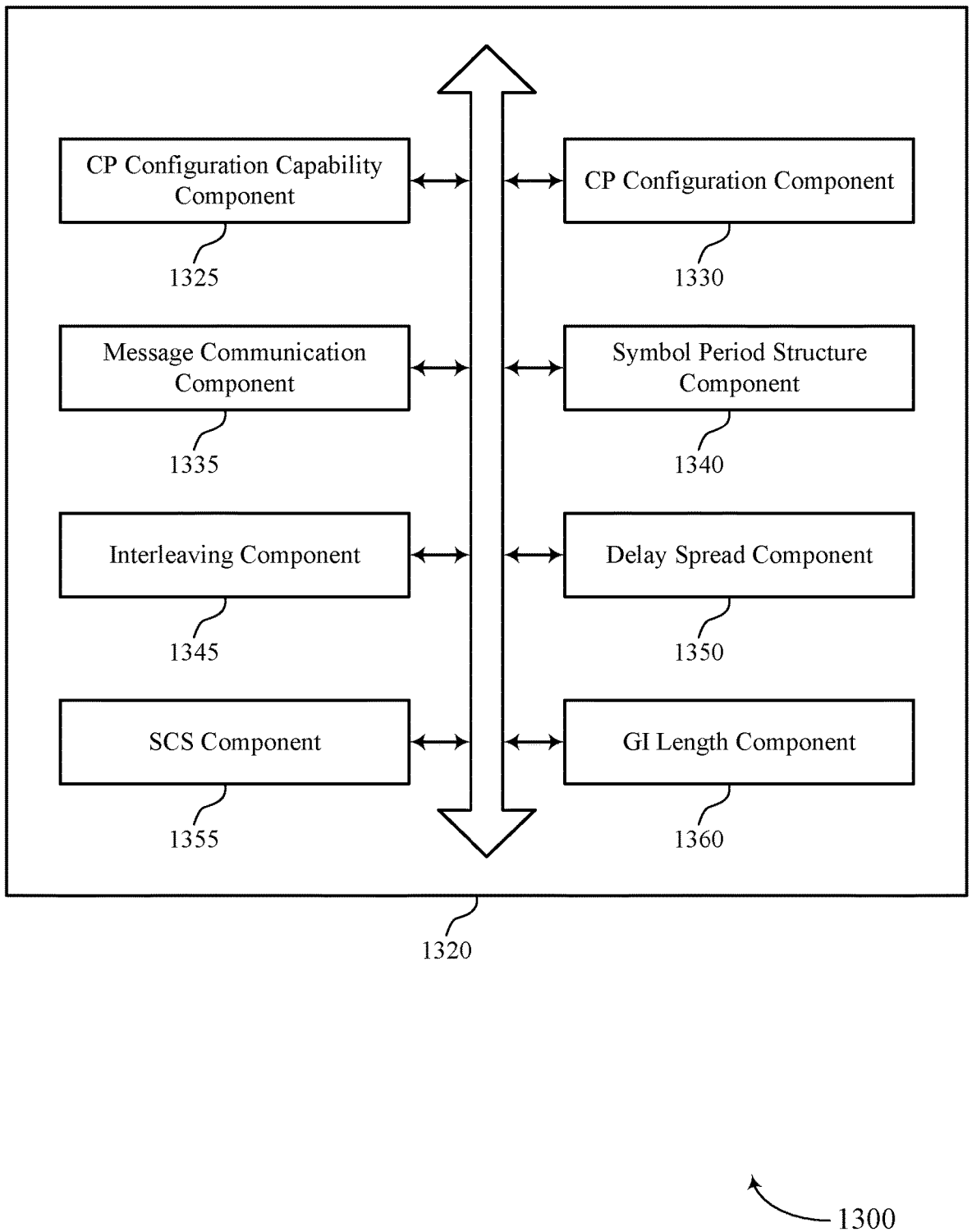
FIG. 13 illustrates a block diagram of a communications manager that supports cyclic prefix guard interval for increased delay spread in accordance with one or more examples as disclosed herein.

FIG. 13 illustrates a block diagram 1300 of a communications manager 1320 that supports cyclic prefix guard interval for increased delay spread in accordance with one or more examples as disclosed herein. The communications manager 1320 may be an example of aspects of a communications manager 1120, a communications manager 1220, or both, as described herein. The communications manager 1320, or various components thereof, may be an example of means for performing various aspects of cyclic prefix guard interval for increased delay spread as described herein. For example, the communications manager 1320 may include a CP configuration capability component 1325, a CP configuration component 1330, a message communication component 1335, a symbol period structure component 1340, an interleaving component 1345, a delay spread component 1350, an SCS component 1355, a GI length component 1360, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

Additionally, or alternatively, the communications manager 1320 may support wireless communication at a network entity in accordance with examples as disclosed herein. The CP configuration capability component 1325 may be configured as or otherwise support a means for receiving, from a UE, an indication that the UE supports a set of multiple cyclic prefix configurations. The CP configuration component 1330 may be configured as or otherwise support a means for transmitting, to the UE, an indication of a first cyclic prefix configuration of the set of multiple cyclic prefix configurations, the first cyclic prefix configuration indicating a first symbol period structure that includes (in some cases, at least a fraction of) a guard interval that occurs in a symbol period prior to a portion of the symbol period copied as a cyclic prefix based on a delay spread exceeding a length of the cyclic prefix. The message communication component 1335 may be configured as or otherwise support a means for communicating one or more messages with the UE in accordance with the first cyclic prefix configuration.

In some examples, to support transmitting the indication of the first cyclic prefix configuration, the symbol period structure component 1340 may be configured as or otherwise support a means for transmitting the indication of the first cyclic prefix configuration that indicates the first symbol period structure has a first guard interval located before the portion of the symbol period copied as the cyclic prefix and a second guard interval located at an end of the portion of the symbol period copied as the cyclic prefix.

In some examples, to support transmitting the indication of the first cyclic prefix configuration, the symbol period structure component 1340 may be configured as or otherwise support a means for transmitting the indication of the first cyclic prefix configuration that indicates a length of the first guard interval and a length of the second guard interval are each less than or equal to a length of the cyclic prefix.

In some examples, to support transmitting the indication of the first cyclic prefix configuration, the symbol period structure component 1340 may be configured as or otherwise support a means for transmitting the indication of the first cyclic prefix configuration that indicates the first symbol period structure includes a set of multiple consecutive guard intervals located at an end of the symbol period.

In some examples, each guard interval is of a length equal to the length of the cyclic prefix and a last guard interval of the set of multiple consecutive guard intervals is included in the portion of the symbol period copied as the cyclic prefix.

In some examples, the first symbol period structure further includes an additional guard interval that is of a length that is less than the length of the cyclic prefix and is located immediately before the set of multiple consecutive guard intervals.

In some examples, to support transmitting the indication of the first cyclic prefix configuration, the interleaving component 1345 may be configured as or otherwise support a means for transmitting the indication of the first cyclic prefix configuration that indicates to interleave that a symbol having the first symbol period structure with a second symbol having a second symbol structure that differs from the first symbol period structure.

In some examples, the delay spread component 1350 may be configured as or otherwise support a means for communicating a delay spread measurement report that indicates the delay spread, where the indication of the first cyclic prefix configuration is based on the delay spread measurement report.

In some examples, to support transmitting the indication of the first cyclic prefix configuration, the symbol period structure component 1340 may be configured as or otherwise support a means for transmitting the indication of the first cyclic prefix configuration that indicates the first symbol period structure includes a set of one or more guard intervals, a quantity of one or more guard intervals, or both.

In some examples, to support transmitting the indication of the first cyclic prefix configuration, the CP configuration component 1330 may be configured as or otherwise support a means for transmitting the indication of the first cyclic prefix configuration that indicates the first symbol period structure includes a set of one or more guard intervals based on a prior cyclic prefix configuration that associates the first symbol period structure with the set of the one or more guard intervals.

In some examples, to support transmitting the indication of the first cyclic prefix configuration, the SCS component 1355 may be configured as or otherwise support a means for transmitting the indication of the first cyclic prefix configuration that indicates the first cyclic prefix configuration is applicable to a set of subcarrier spacing values, is inapplicable to one or more other subcarrier spacing values, or both.

In some examples, to support transmitting the indication of the first cyclic prefix configuration, the SCS component 1355 may be configured as or otherwise support a means for transmitting the indication of the first cyclic prefix configuration that indicates the first cyclic prefix configuration is applicable to a first subcarrier spacing.

In some examples, the SCS component 1355 may be configured as or otherwise support a means for transmitting an indication that the UE is to derive a second cyclic prefix configuration for a second subcarrier spacing based on the first cyclic prefix configuration and a delay spread capability of the UE associated with the first cyclic prefix configuration.

In some examples, the indication of the first cyclic prefix configuration is transmitted via control signaling.

In some examples, the first cyclic prefix configuration is applicable to uplink communications, downlink communications, or both.

Figure 14:
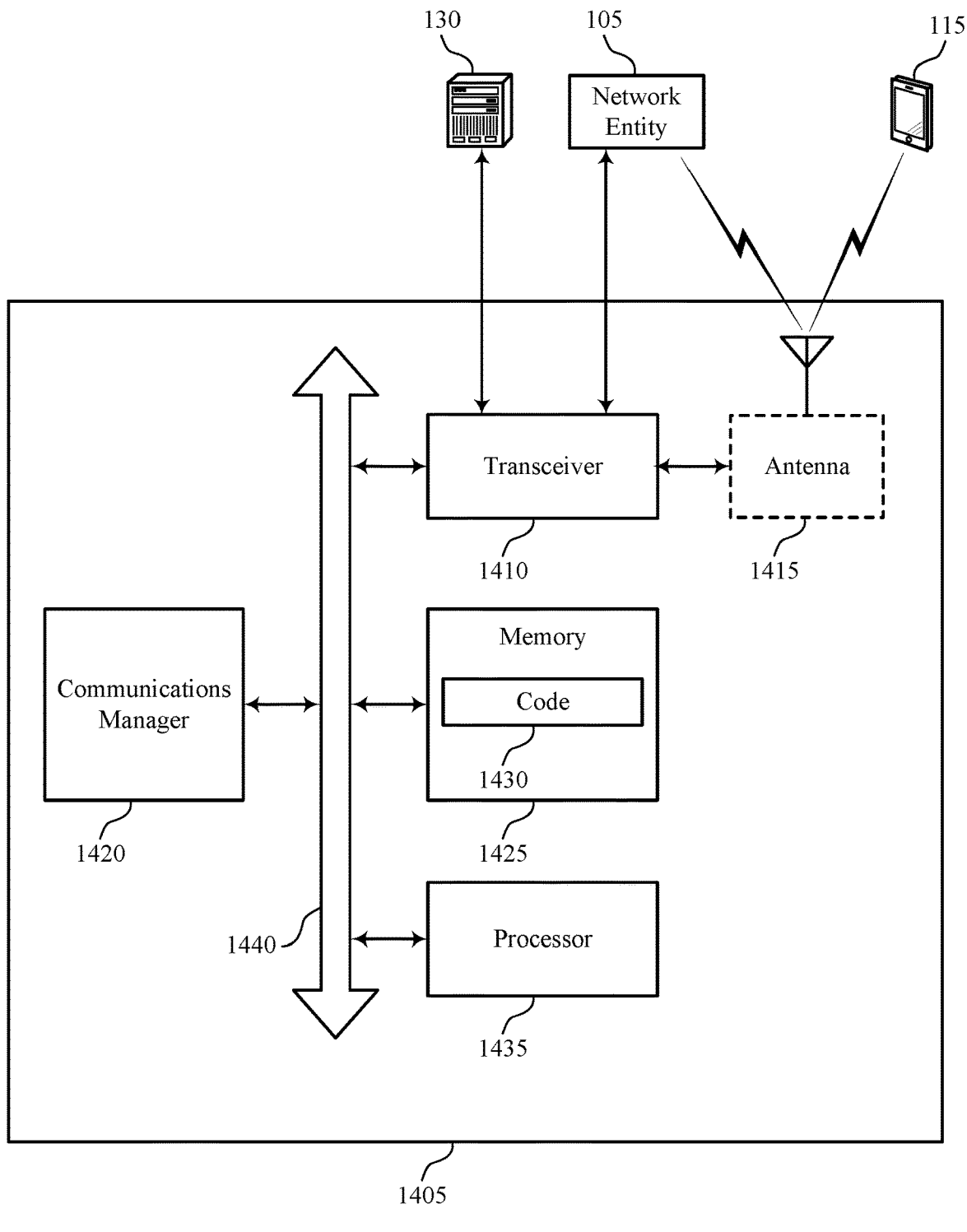
FIG. 14 illustrates a diagram of a system including a device that supports cyclic prefix guard interval for increased delay spread in accordance with one or more examples as disclosed herein.

FIG. 14 illustrates a diagram of a system 1400 including a device 1405 that supports cyclic prefix guard interval for increased delay spread in accordance with one or more examples as disclosed herein. The device 1405 may be an example of or include the components of a device 1105, a device 1205, or a network entity 105 as described herein. The device 1405 may communicate with one or more network entities 105, one or more UEs 115, or any combination thereof, which may include communications over one or more wired interfaces, over one or more wireless interfaces, or any combination thereof. The device 1405 may include components that support outputting and obtaining communications, such as a communications manager 1420, a transceiver 1410, an antenna 1415, a memory 1425, code 1430, and a processor 1435. These components may be in electronic communication or otherwise coupled (e.g., operatively, communicatively, functionally, electronically, electrically) via one or more buses (e.g., a bus 1440).

The transceiver 1410 may support bi-directional communications via wired links, wireless links, or both as described herein. In some examples, the transceiver 1410 may include a wired transceiver and may communicate bi-directionally with another wired transceiver. Additionally, or alternatively, in some examples, the transceiver 1410 may include a wireless transceiver and may communicate bi-directionally with another wireless transceiver. In some examples, the device 1405 may include one or more antennas 1415, which may be capable of transmitting or receiving wireless transmissions (e.g., concurrently). The transceiver 1410 may also include a modem to modulate signals, to provide the modulated signals for transmission (e.g., by one or more antennas 1415, by a wired transmitter), to receive modulated signals (e.g., from one or more antennas 1415, from a wired receiver), and to demodulate signals. In some implementations, the transceiver 1410 may include one or more interfaces, such as one or more interfaces coupled with the one or more antennas 1415 that are configured to support various receiving or obtaining operations, or one or more interfaces coupled with the one or more antennas 1415 that are configured to support various transmitting or outputting operations, or a combination thereof. In some implementations, the transceiver 1410 may include or be configured for coupling with one or more processors or memory components that are operable to perform or support operations based on received or obtained information or signals, or to generate information or other signals for transmission or other outputting, or any combination thereof. In some implementations, the transceiver 1410, or the transceiver 1410 and the one or more antennas 1415, or the transceiver 1410 and the one or more antennas 1415 and one or more processors or memory components (for example, the processor 1435, or the memory 1425, or both), may be included in a chip or chip assembly that is installed in the device 1405. In some examples, the transceiver may be operable to support communications via one or more communications links (e.g., a communication link 125, a backhaul communication link 120, a midhaul communication link 162, a fronthaul communication link 168).

The memory 1425 may include RAM and ROM. The memory 1425 may store computer-readable, computer-executable code 1430 including instructions that, when executed by the processor 1435, cause the device 1405 to perform various functions described herein. The code 1430 may be stored in a non-transitory computer-readable medium such as system memory or another type of memory. In some cases, the code 1430 may not be directly executable by the processor 1435 but may cause a computer (e.g., when compiled and executed) to perform functions described herein. In some cases, the memory 1425 may contain, among other things, a BIOS which may control basic hardware or software operation such as the interaction with peripheral components or devices.

The processor 1435 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1435 may be configured to operate a memory array using a memory controller. In some other cases, a memory controller may be integrated into the processor 1435. The processor 1435 may be configured to execute computer-readable instructions stored in a memory (e.g., the memory 1425) to cause the device 1405 to perform various functions (e.g., functions or tasks supporting cyclic prefix guard interval for increased delay spread). For example, the device 1405 or a component of the device 1405 may include a processor 1435 and memory 1425 coupled with the processor 1435, the processor 1435 and memory 1425 configured to perform various functions described herein. The processor 1435 may be an example of a cloud-computing platform (e.g., one or more physical nodes and supporting software such as operating systems, virtual machines, or container instances) that may host the functions (e.g., by executing code 1430) to perform the functions of the device 1405. The processor 1435 may be any one or more suitable processors capable of executing scripts or instructions of one or more software programs stored in the device 1405 (such as within the memory 1425). In some implementations, the processor 1435 may be a component of a processing system. A processing system may generally refer to a system or series of machines or components that receives inputs and processes the inputs to produce a set of outputs (which may be passed to other systems or components of, for example, the device 1405). For example, a processing system of the device 1405 may refer to a system including the various other components or subcomponents of the device 1405, such as the processor 1435, or the transceiver 1410, or the communications manager 1420, or other components or combinations of components of the device 1405. The processing system of the device 1405 may interface with other components of the device 1405, and may process information received from other components (such as inputs or signals) or output information to other components. For example, a chip or modem of the device 1405 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1405 may transmit information output from the chip or modem. Additionally, or alternatively, in some implementations, the one or more interfaces may refer to an interface between the processing system of the chip or modem and a receiver, such that the device 1405 may obtain information or signal inputs, and the information may be passed to the processing system. A person having ordinary skill in the art will readily recognize that a first interface also may obtain information or signal inputs, and a second interface also may output information or signal outputs.

In some examples, a bus 1440 may support communications of (e.g., within) a protocol layer of a protocol stack. In some examples, a bus 1440 may support communications associated with a logical channel of a protocol stack (e.g., between protocol layers of a protocol stack), which may include communications performed within a component of the device 1405, or between different components of the device 1405 that may be co-located or located in different locations (e.g., where the device 1405 may refer to a system in which one or more of the communications manager 1420, the transceiver 1410, the memory 1425, the code 1430, and the processor 1435 may be located in one of the different components or divided between different components).

In some examples, the communications manager 1420 may manage aspects of communications with a core network 130 (e.g., via one or more wired or wireless backhaul links). For example, the communications manager 1420 may manage the transfer of data communications for client devices, such as one or more UEs 115. In some examples, the communications manager 1420 may manage communications with other network entities 105, and may include a controller or scheduler for controlling communications with UEs 115 in cooperation with other network entities 105. In some examples, the communications manager 1420 may support an X2 interface within an LTE/LTE-A wireless communications network technology to provide communication between network entities 105.

Additionally, or alternatively, the communications manager 1420 may support wireless communication at a network entity in accordance with examples as disclosed herein. For example, the communications manager 1420 may be configured as or otherwise support a means for receiving, from a UE, an indication that the UE supports a set of multiple cyclic prefix configurations. The communications manager 1420 may be configured as or otherwise support a means for transmitting, to the UE, an indication of a first cyclic prefix configuration of the set of multiple cyclic prefix configurations, the first cyclic prefix configuration indicating a first symbol period structure that includes (in some cases, at least a fraction of) a guard interval that occurs in a symbol period prior to a portion of the symbol period copied as a cyclic prefix based on a delay spread exceeding a length of the cyclic prefix. The communications manager 1420 may be configured as or otherwise support a means for communicating one or more messages with the UE in accordance with the first cyclic prefix configuration.

By including or configuring the communications manager 1420 in accordance with examples as described herein, the device 1405 may support techniques for improved communication reliability, reduced latency, improved user experience related to reduced processing, reduced power consumption, more efficient utilization of communication resources, improved coordination between devices, longer battery life, improved utilization of processing capability, or any combination thereof.

In some examples, the communications manager 1420 may be configured to perform various operations (e.g., receiving, obtaining, monitoring, outputting, transmitting) using or otherwise in cooperation with the transceiver 1410, the one or more antennas 1415 (e.g., where applicable), or any combination thereof. Although the communications manager 1420 is illustrated as a separate component, in some examples, one or more functions described with reference to the communications manager 1420 may be supported by or performed by the transceiver 1410, the processor 1435, the memory 1425, the code 1430, or any combination thereof. For example, the code 1430 may include instructions executable by the processor 1435 to cause the device 1405 to perform various aspects of cyclic prefix guard interval for increased delay spread as described herein, or the processor 1435 and the memory 1425 may be otherwise configured to perform or support such operations.

Figure 15:
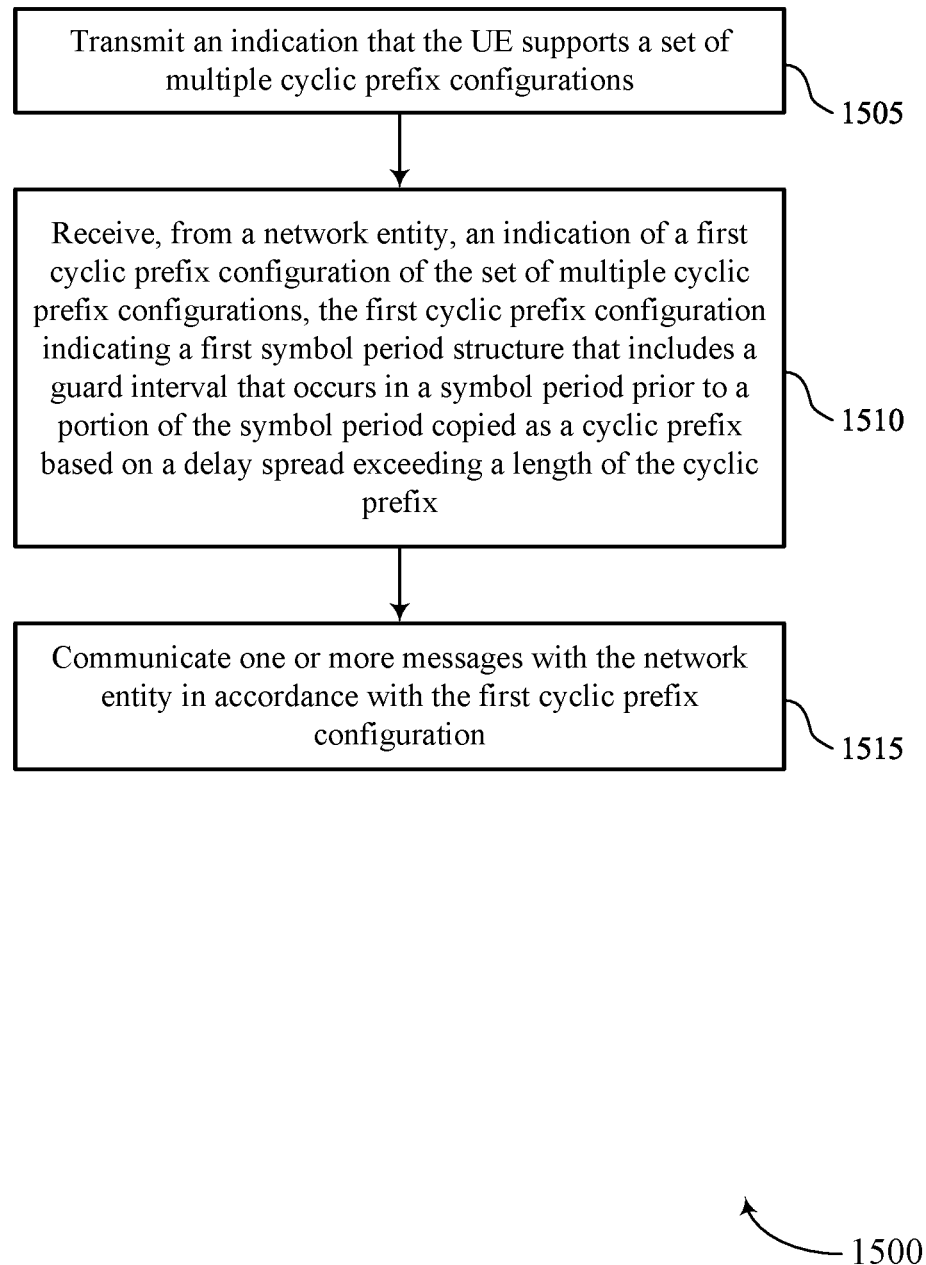
FIGS. 15 and 16 illustrate flowcharts showing methods that support cyclic prefix guard interval for increased delay spread in accordance with one or more examples as disclosed herein.

FIG. 15 illustrates a flowchart showing a method 1500 that supports cyclic prefix guard interval for increased delay spread in accordance with one or more examples as disclosed herein. The operations of the method 1500 may be implemented by a UE or its components as described herein. For example, the operations of the method 1500 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1505, the method may include transmitting an indication that the UE supports a set of multiple cyclic prefix configurations. The operations of 1505 may be performed in accordance with examples as disclosed herein. In some examples, aspects of the operations of 1505 may be performed by a CP configuration capability component 925 as described with reference to FIG. 9.

At 1510, the method may include receiving, from a network entity, an indication of a first cyclic prefix configuration of the set of multiple cyclic prefix configurations, the first cyclic prefix configuration indicating a first symbol period structure that includes (in some cases, at least a fraction of) a guard interval that occurs in a symbol period prior to a portion of the symbol period copied as a cyclic prefix based on a delay spread exceeding a length of the cyclic prefix. The operations of 1510 may be performed in accordance with examples as disclosed herein. In some examples, aspects of the operations of 1510 may be performed by a CP configuration component 930 as described with reference to FIG. 9.

At 1515, the method may include communicating one or more messages with the network entity in accordance with the first cyclic prefix configuration. The operations of 1515 may be performed in accordance with examples as disclosed herein. In some examples, aspects of the operations of 1515 may be performed by a message communication component 935 as described with reference to FIG. 9.

Figure 16:
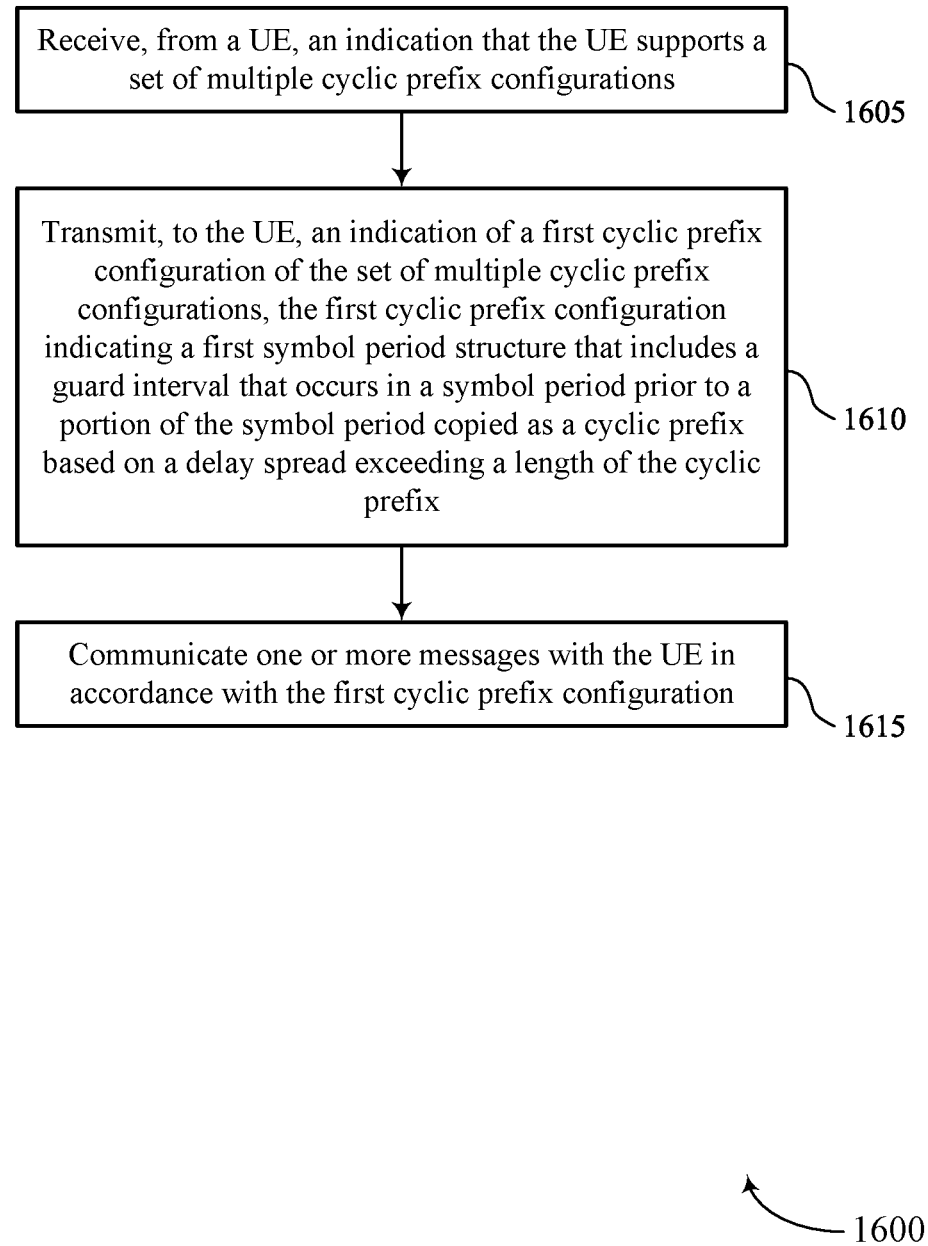

FIG. 16 illustrates a flowchart showing a method 1600 that supports cyclic prefix guard interval for increased delay spread in accordance with one or more examples as disclosed herein. The operations of the method 1600 may be implemented by a network entity or its components as described herein. For example, the operations of the method 1600 may be performed by a network entity as described with reference to FIGS. 1 through 6 and 11 through 14. In some examples, a network entity may execute a set of instructions to control the functional elements of the network entity to perform the described functions. Additionally, or alternatively, the network entity may perform aspects of the described functions using special-purpose hardware.

At 1605, the method may include receiving, from a UE, an indication that the UE supports a set of multiple cyclic prefix configurations. The operations of 1605 may be performed in accordance with examples as disclosed herein. In some examples, aspects of the operations of 1605 may be performed by a CP configuration capability component 1325 as described with reference to FIG. 13.

At 1610, the method may include transmitting, to the UE, an indication of a first cyclic prefix configuration of the set of multiple cyclic prefix configurations, the first cyclic prefix configuration indicating a first symbol period structure that includes (in some cases, at least a fraction of) a guard interval that occurs in a symbol period prior to a portion of the symbol period copied as a cyclic prefix based on a delay spread exceeding a length of the cyclic prefix. The operations of 1610 may be performed in accordance with examples as disclosed herein. In some examples, aspects of the operations of 1610 may be performed by a CP configuration component 1330 as described with reference to FIG. 13.

At 1615, the method may include communicating one or more messages with the UE in accordance with the first cyclic prefix configuration. The operations of 1615 may be performed in accordance with examples as disclosed herein. In some examples, aspects of the operations of 1615 may be performed by a message communication component 1335 as described with reference to FIG. 13.

The following provides an overview of aspects of the present disclosure:

Aspect 1: A method for wireless communication at a UE, comprising: transmitting an indication that the UE supports a plurality of cyclic prefix symbol configurations; receiving, from a network entity, an indication of a first cyclic prefix configuration of the plurality of cyclic prefix symbol configurations, the first cyclic prefix configuration indicating a first symbol period structure that includes a guard interval that occurs in a symbol period prior to a portion of the symbol period copied as a cyclic prefix based at least in part on a delay spread exceeding a length of the cyclic prefix; and communicating one or more messages with the network entity in accordance with the first cyclic prefix configuration.

Aspect 2: The method of aspect 1, wherein receiving the indication of the first cyclic prefix configuration further comprises: receiving the indication of the first cyclic prefix configuration that indicates the first symbol period structure has a first guard interval located before the portion of the symbol period copied as the cyclic prefix and a second guard interval located at an end of the portion of the symbol period copied as the cyclic prefix.

Aspect 3: The method of aspect 2, wherein receiving the indication of the first cyclic prefix configuration further comprises: receiving the indication of the first cyclic prefix configuration that indicates a length of the first guard interval and a length of the second guard interval are each less than or equal to a length of the cyclic prefix.

Aspect 4: The method of any of aspects 1 through 3, wherein receiving the indication of the first cyclic prefix configuration further comprises: receiving the indication of the first cyclic prefix configuration that indicates the first symbol period structure includes a plurality of consecutive guard intervals located at an end of the symbol period.

Aspect 5: The method of aspect 4, wherein each guard interval is of a length equal to the length of the cyclic prefix and a last guard interval of the plurality of consecutive guard intervals is comprised in the portion of the symbol period copied as the cyclic prefix.

Aspect 6: The method of any of aspects 4 through 5, wherein the first symbol period structure further includes an additional guard interval that is of a length that is less than the length of the cyclic prefix and is located immediately before the plurality of consecutive guard intervals.

Aspect 7: The method of any of aspects 1 through 6, wherein receiving the indication of the first cyclic prefix configuration further comprises: receiving the indication of the first cyclic prefix configuration that indicates to interleave that a symbol having the first symbol period structure with a second symbol having a second symbol period structure that differs from the first symbol period structure.

Aspect 8: The method of any of aspects 1 through 7, further comprising: communicating a delay spread measurement report that indicates the delay spread, wherein the indication of the first cyclic prefix configuration is based at least in part on the delay spread measurement report.

Aspect 9: The method of any of aspects 1 through 8, wherein receiving the indication of the first cyclic prefix configuration further comprises: receiving the indication of the first cyclic prefix configuration that indicates the first symbol period structure comprises a set of one or more guard intervals, a quantity of one or more guard intervals, or both.

Aspect 10: The method of any of aspects 1 through 9, further comprising: receiving an indication of a delay spread associated with uplink transmissions from the UE; and selecting the first cyclic prefix configuration based at least in part on to indication of the delay spread.

Aspect 11: The method of any of aspects 1 through 10, wherein receiving the indication of the first cyclic prefix configuration further comprises: receiving the indication of the first cyclic prefix configuration that indicates the first symbol period structure comprises a set of one or more guard intervals based at least in part on a prior cyclic prefix configuration that associates the first symbol period structure with the set of the one or more guard intervals.

Aspect 12: The method of any of aspects 1 through 11, wherein receiving the indication of the first cyclic prefix configuration further comprises: receiving the indication of the first cyclic prefix configuration that indicates the first cyclic prefix configuration is applicable to a set of subcarrier spacing values, is inapplicable to one or more other subcarrier spacing values, or both.

Aspect 13: The method of any of aspects 1 through 12, wherein receiving the indication of the first cyclic prefix configuration further comprises: receiving the indication of the first cyclic prefix configuration that indicates the first cyclic prefix configuration is applicable to a first subcarrier spacing.

Aspect 14: The method of aspect 13, further comprising: receiving an indication that the UE is to derive a second cyclic prefix configuration for a second subcarrier spacing based at least in part on the first cyclic prefix configuration and a delay spread capability of the UE associated with the first cyclic prefix configuration.

Aspect 15: The method of any of aspects 1 through 14, wherein the indication of the first cyclic prefix configuration is transmitted via radio resource control signaling, medium access control control signaling, physical layer control signaling, or any combination thereof.

Aspect 16: The method of any of aspects 1 through 15, wherein receiving the indication of the first cyclic prefix configuration further comprises: receiving the indication of the first cyclic prefix configuration that indicates quantized values corresponding to one or more lengths of one or more guard intervals of the first symbol period structure.

Aspect 17: The method of any of aspects 1 through 16, wherein the first cyclic prefix configuration is applicable to uplink communications, downlink communications, or both.

Aspect 18: A method for wireless communication at a network entity, comprising: receiving, from a UE, an indication that the UE supports a plurality of cyclic prefix symbol configurations; transmitting, to the UE, an indication of a first cyclic prefix configuration of the plurality of cyclic prefix symbol configurations, the first cyclic prefix configuration indicating a first symbol period structure that includes a guard interval that occurs in a symbol period prior to a portion of the symbol period copied as a cyclic prefix based at least in part on a delay spread exceeding a length of the cyclic prefix; and communicating one or more messages with the UE in accordance with the first cyclic prefix configuration.

Aspect 19: The method of aspect 18, wherein transmitting the indication of the first cyclic prefix configuration further comprises: transmitting the indication of the first cyclic prefix configuration that indicates the first symbol period structure has a first guard interval located before the portion of the symbol period copied as the cyclic prefix and a second guard interval located at an end of the portion of the symbol period copied as the cyclic prefix.

Aspect 20: The method of aspect 19, wherein transmitting the indication of the first cyclic prefix configuration further comprises: transmitting the indication of the first cyclic prefix configuration that indicates a length of the first guard interval and a length of the second guard interval are each less than or equal to a length of the cyclic prefix.

Aspect 21: The method of any of aspects 18 through 20, wherein transmitting the indication of the first cyclic prefix configuration further comprises: transmitting the indication of the first cyclic prefix configuration that indicates the first symbol period structure includes a plurality of consecutive guard intervals located at an end of the symbol period.

Aspect 22: The method of aspect 21, wherein each guard interval is of a length equal to the length of the cyclic prefix and a last guard interval of the plurality of consecutive guard intervals is comprised in the portion of the symbol period copied as the cyclic prefix.

Aspect 23: The method of any of aspects 21 through 22, wherein the first symbol period structure further includes an additional guard interval that is of a length that is less than the length of the cyclic prefix and is located immediately before the plurality of consecutive guard intervals.

Aspect 24: The method of any of aspects 18 through 23, wherein transmitting the indication of the first cyclic prefix configuration further comprises: transmitting the indication of the first cyclic prefix configuration that indicates to interleave that a symbol having the first symbol period structure with a second symbol having a second symbol structure that differs from the first symbol period structure.

Aspect 25: The method of any of aspects 18 through 24, further comprising: communicating a delay spread measurement report that indicates the delay spread, wherein the indication of the first cyclic prefix configuration is based at least in part on the delay spread measurement report.

Aspect 26: The method of any of aspects 18 through 25, wherein transmitting the indication of the first cyclic prefix configuration further comprises: transmitting the indication of the first cyclic prefix configuration that indicates the first symbol period structure comprises a set of one or more guard intervals, a quantity of one or more guard intervals, or both.

Aspect 27: The method of any of aspects 18 through 26, wherein transmitting the indication of the first cyclic prefix configuration further comprises: transmitting the indication of the first cyclic prefix configuration that indicates the first symbol period structure comprises a set of one or more guard intervals based at least in part on a prior cyclic prefix configuration that associates the first symbol period structure with the set of the one or more guard intervals.

Aspect 28: The method of any of aspects 18 through 27, wherein transmitting the indication of the first cyclic prefix configuration further comprises: transmitting the indication of the first cyclic prefix configuration that indicates the first cyclic prefix configuration is applicable to a set of subcarrier spacing values, is inapplicable to one or more other subcarrier spacing values, or both.

Aspect 29: The method of any of aspects 18 through 28, wherein transmitting the indication of the first cyclic prefix configuration further comprises: transmitting the indication of the first cyclic prefix configuration that indicates the first cyclic prefix configuration is applicable to a first subcarrier spacing.

Aspect 30: The method of aspect 29, further comprising: transmitting an indication that the UE is to derive a second cyclic prefix configuration for a second subcarrier spacing based at least in part on the first cyclic prefix configuration and a delay spread capability of the UE associated with the first cyclic prefix configuration.

Aspect 31: The method of any of aspects 18 through 30, wherein the indication of the first cyclic prefix configuration is transmitted via control signaling.

Aspect 32: The method of any of aspects 18 through 31, wherein the first cyclic prefix configuration is applicable to uplink communications, downlink communications, or both.

Aspect 33: An apparatus for wireless communication at a UE, comprising a processor; memory coupled with the processor; and instructions stored in the memory and executable by the processor to cause the apparatus to perform a method of any of aspects 1 through 17.

Aspect 34: An apparatus for wireless communication at a UE, comprising at least one means for performing a method of any of aspects 1 through 17.

Aspect 35: A non-transitory computer-readable medium storing code for wireless communication at a UE, the code comprising instructions executable by a processor to perform a method of any of aspects 1 through 17.

Aspect 36: An apparatus for wireless communication at a network entity, comprising a processor; memory coupled with the processor; and instructions stored in the memory and executable by the processor to cause the apparatus to perform a method of any of aspects 18 through 32.

Aspect 37: An apparatus for wireless communication at a network entity, comprising at least one means for performing a method of any of aspects 18 through 32.

Aspect 38: A non-transitory computer-readable medium storing code for wireless communication at a network entity, the code comprising instructions executable by a processor to perform a method of any of aspects 18 through 32.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a user equipment (UE), comprising:

a processor;

memory coupled with the processor; and instructions stored in the memory and executable by the processor to cause the apparatus to:

transmit an indication that the UE supports a plurality of cyclic prefix configurations;

receive, from a network entity, an indication of a first cyclic prefix configuration of the plurality of cyclic prefix configurations, the first cyclic prefix configuration indicating a first symbol period structure that includes a guard interval that occurs in a symbol period prior to a portion of the symbol period copied as a cyclic prefix based at least in part on a delay spread exceeding a length of the cyclic prefix; and communicate one or more messages with the network entity in accordance with the first cyclic prefix configuration.

2. The apparatus of claim 1, wherein the instructions to receive the indication of the first cyclic prefix configuration are further executable by the processor to cause the apparatus to:

receive the indication of the first cyclic prefix configuration that indicates the first symbol period structure has a first guard interval located before the portion of the symbol period copied as the cyclic prefix and a second guard interval located at an end of the portion of the symbol period copied as the cyclic prefix.

3. The apparatus of claim 2, wherein the instructions to receive the indication of the first cyclic prefix configuration are further executable by the processor to cause the apparatus to:

receive the indication of the first cyclic prefix configuration that indicates a length of the first guard interval and a length of the second guard interval are each less than or equal to a length of the cyclic prefix.

4. The apparatus of claim 1, wherein the instructions to receive the indication of the first cyclic prefix configuration are further executable by the processor to cause the apparatus to:

receive the indication of the first cyclic prefix configuration that indicates the first symbol period structure includes a plurality of consecutive guard intervals located at an end of the symbol period.

5. The apparatus of claim 4, wherein each guard interval is of a length equal to the length of the cyclic prefix and a last guard interval of the plurality of consecutive guard intervals is comprised in the portion of the symbol period copied as the cyclic prefix.

6. The apparatus of claim 4, wherein the first symbol period structure further includes an additional guard interval that is of a length that is less than the length of the cyclic prefix and is located immediately before the plurality of consecutive guard intervals.

7. The apparatus of claim 1, wherein the instructions to receive the indication of the first cyclic prefix configuration are further executable by the processor to cause the apparatus to:

receive the indication of the first cyclic prefix configuration that indicates to interleave that a symbol having the first symbol period structure with a second symbol having a second symbol structure that differs from the first symbol period structure.

8. The apparatus of claim 1, wherein the instructions are further executable by the processor to cause the apparatus to:

communicate a delay spread measurement report that indicates the delay spread;

wherein the indication of the first cyclic prefix configuration is based at least in part on the delay spread measurement report.

9. The apparatus of claim 1, wherein the instructions to receive the indication of the first cyclic prefix configuration are further executable by the processor to cause the apparatus to:

receive the indication of the first cyclic prefix configuration that indicates the first symbol period structure comprises a set of one or more guard intervals, a quantity of one or more guard intervals, or both.

10. The apparatus of claim 1, wherein the instructions are further executable by the processor to cause the apparatus to:

receive an indication of a delay spread associated with uplink transmissions from the UE; and select the first cyclic prefix configuration based at least in part on the indication of the delay spread.

11. The apparatus of claim 1, wherein the instructions to receive the indication of the first cyclic prefix configuration are further executable by the processor to cause the apparatus to:

receive the indication of the first cyclic prefix configuration that indicates the first symbol period structure comprises a set of one or more guard intervals based at least in part on a prior cyclic prefix configuration that associates the first symbol period structure with the set of the one or more guard intervals.

12. The apparatus of claim 1, wherein the instructions to receive the indication of the first cyclic prefix configuration are further executable by the processor to cause the apparatus to:

receive the indication of the first cyclic prefix configuration that indicates the first cyclic prefix configuration is applicable to a set of subcarrier spacing values, is inapplicable to one or more other subcarrier spacing values, or both.

13. The apparatus of claim 1, wherein the instructions to receive the indication of the first cyclic prefix configuration are further executable by the processor to cause the apparatus to:

receive the indication of the first cyclic prefix configuration that indicates the first cyclic prefix configuration is applicable to a first subcarrier spacing.

14. The apparatus of claim 13, wherein the instructions are further executable by the processor to cause the apparatus to:

receive an indication that the UE is to derive a second cyclic prefix configuration for a second subcarrier spacing based at least in part on the first cyclic prefix configuration and a delay spread capability of the UE associated with the first cyclic prefix configuration.

15. The apparatus of claim 1, wherein the indication of the first cyclic prefix configuration is transmitted via radio resource control signaling, medium access control control signaling, physical layer control signaling, or any combination thereof.

16. The apparatus of claim 1, wherein the instructions to receive the indication of the first cyclic prefix configuration are further executable by the processor to cause the apparatus to:

receive the indication of the first cyclic prefix configuration that indicates quantized values corresponding to one or more lengths of one or more guard intervals of the first symbol period structure.

17. The apparatus of claim 1, wherein the first cyclic prefix configuration is applicable to uplink communications, downlink communications, or both.

18. An apparatus for wireless communication at a network entity, comprising:
a processor;
memory coupled with the processor; and
instructions stored in the memory and executable by the processor to cause the apparatus to:
receive, from a user equipment (UE), an indication that the UE supports a plurality of cyclic prefix configurations;
transmit, to the UE, an indication of a first cyclic prefix configuration of the plurality of cyclic prefix configurations, the first cyclic prefix configuration indicating a first symbol period structure that includes a guard interval that occurs in a symbol period prior to a portion of the symbol period copied as a cyclic prefix based at least in part on a delay spread exceeding a length of the cyclic prefix; and
communicate one or more messages with the UE in accordance with the first cyclic prefix configuration.

19. The apparatus of claim 18, wherein the instructions to transmit the indication of the first cyclic prefix configuration are further executable by the processor to cause the apparatus to:
transmit the indication of the first cyclic prefix configuration that indicates the first symbol period structure has a first guard interval located before the portion of the symbol period copied as the cyclic prefix and a second guard interval located at an end of the portion of the symbol period copied as the cyclic prefix.

20. The apparatus of claim 19, wherein the instructions to transmit the indication of the first cyclic prefix configuration are further executable by the processor to cause the apparatus to:
transmit the indication of the first cyclic prefix configuration that indicates a length of the first guard interval and a length of the second guard interval are each less than or equal to a length of the cyclic prefix.

21. The apparatus of claim 18, wherein the instructions to transmit the indication of the first cyclic prefix configuration are further executable by the processor to cause the apparatus to:
transmit the indication of the first cyclic prefix configuration that indicates the first symbol period structure includes a plurality of consecutive guard intervals located at an end of the symbol period.

22. The apparatus of claim 21, wherein each guard interval is of a length equal to the length of the cyclic prefix and a last guard interval of the plurality of consecutive guard intervals is comprised in the portion of the symbol period copied as the cyclic prefix.

23. The apparatus of claim 21, wherein the first symbol period structure further includes an additional guard interval that is of a length that is less than the length of the cyclic prefix and is located immediately before the plurality of consecutive guard intervals.

24. The apparatus of claim 18, wherein the instructions to transmit the indication of the first cyclic prefix configuration are further executable by the processor to cause the apparatus to:
transmit the indication of the first cyclic prefix configuration that indicates to interleave that a symbol having the first symbol period structure with a second symbol having a second symbol structure that differs from the first symbol period structure.

25. The apparatus of claim 18, wherein the instructions are further executable by the processor to cause the apparatus to:
communicate a delay spread measurement report that indicates the delay spread;
wherein the indication of the first cyclic prefix configuration is based at least in part on the delay spread measurement report.

26. The apparatus of claim 18, wherein the instructions to transmit the indication of the first cyclic prefix configuration are further executable by the processor to cause the apparatus to:
transmit the indication of the first cyclic prefix configuration that indicates the first symbol period structure comprises a set of one or more guard intervals based at least in part on a prior cyclic prefix configuration that associates the first symbol period structure with the set of the one or more guard intervals.

27. The apparatus of claim 18, wherein the instructions to transmit the indication of the first cyclic prefix configuration are further executable by the processor to cause the apparatus to:
transmit the indication of the first cyclic prefix configuration that indicates the first cyclic prefix configuration is applicable to a set of subcarrier spacing values, is inapplicable to one or more other subcarrier spacing values, or both.

28. The apparatus of claim 18, wherein the instructions to transmit the indication of the first cyclic prefix configuration are further executable by the processor to cause the apparatus to:
transmit the indication of the first cyclic prefix configuration that indicates the first cyclic prefix configuration is applicable to a first subcarrier spacing.

29. A method for wireless communication at a user equipment (UE), comprising:
transmitting an indication that the UE supports a plurality of cyclic prefix configurations;
receiving, from a network entity, an indication of a first cyclic prefix configuration of the plurality of cyclic prefix configurations, the first cyclic prefix configuration indicating a first symbol period structure that includes a guard interval that occurs in a symbol period prior to a portion of the symbol period copied as a cyclic prefix based at least in part on a delay spread exceeding a length of the cyclic prefix; and
communicating one or more messages with the network entity in accordance with the first cyclic prefix configuration.

30. A method for wireless communication at a network entity, comprising:
receiving, from a user equipment (UE), an indication that the UE supports a plurality of cyclic prefix configurations;
transmitting, to the UE, an indication of a first cyclic prefix configuration of the plurality of cyclic prefix configurations, the first cyclic prefix configuration indicating a first symbol period structure that includes a guard interval that occurs in a symbol period prior to a portion of the symbol period copied as a cyclic prefix based at least in part on a delay spread exceeding a length of the cyclic prefix; and
communicating one or more messages with the UE in accordance with the first cyclic prefix configuration.

* * * * *